(12) United States Patent
Hashido et al.

(10) Patent No.: US 8,641,086 B2
(45) Date of Patent: Feb. 4, 2014

(54) SEAT CUSHION AIRBAG DEVICE

(75) Inventors: Tatsuya Hashido, Kiyosu (JP);
Takanori Kanto, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/614,047

(22) Filed: Sep. 13, 2012

(65) Prior Publication Data

US 2013/0082457 A1    Apr. 4, 2013

(30) Foreign Application Priority Data

Sep. 30, 2011   (JP) .................................. 2011-216163

(51) Int. Cl.
*B60R 21/207*    (2006.01)

(52) U.S. Cl.
USPC ................. 280/730.1; 280/743.1; 297/452.42

(58) Field of Classification Search
USPC ...................... 280/730.1, 743.1; 62/244, 3.61; 297/180.14, 452.42, 452.46, 452.47
See application file for complete search history.

(56) References Cited

U.S. PATENT DOCUMENTS

| 5,921,100 | A | | 7/1999 | Yoshinori et al. | |
|---|---|---|---|---|---|
| 6,874,811 | B2 | * | 4/2005 | Enders et al. | 280/730.1 |
| 6,935,684 | B2 | * | 8/2005 | Sakai | 297/216.1 |
| 7,013,653 | B2 | * | 3/2006 | Kamiya et al. | 62/3.61 |
| 7,201,441 | B2 | * | 4/2007 | Stoewe et al. | 297/180.14 |
| 7,246,677 | B2 | * | 7/2007 | Fredriksson et al. | 180/274 |
| 7,527,333 | B2 | * | 5/2009 | Suzuki et al. | 297/216.1 |
| 7,607,728 | B2 | * | 10/2009 | Hiruta et al. | 297/216.1 |
| 7,789,417 | B2 | * | 9/2010 | Yoshikawa et al. | 280/730.1 |
| 2006/0017266 | A1 | * | 1/2006 | Yoshikawa et al. | 280/730.1 |
| 2007/0132214 | A1 | * | 6/2007 | Suzuki et al. | 280/730.1 |
| 2009/0289479 | A1 | * | 11/2009 | Kumagai | 297/216.1 |

FOREIGN PATENT DOCUMENTS

| JP | A-H11-48772 | 2/1999 |
|---|---|---|
| JP | 2002-079861 | 3/2002 |
| JP | 2005-306252 | 11/2005 |

* cited by examiner

*Primary Examiner* — Drew Brown
(74) *Attorney, Agent, or Firm* — Posz Law Group, PLC

(57) ABSTRACT

A seat cushion airbag device mountable to a vehicle seat that includes: a seat section including a seat cushion supported by a support section; and a blower duct having an outlet provided below the seat cushion so as to allow air-conditioning air to be ejected upward. The cushion airbag device includes an airbag, at least a part of which is inflated with an inflating fluid such that a seat surface of the seat section is bulged out. The airbag includes a folded portion. Before the airbag is inflated with the inflating fluid, the airbag is disposed at a position on a front side of the outlet while the folded portion is folded such that the outlet is exposed from the airbag. When the airbag is inflated, the folded portion is deployed so as to extend to a position on a rear side of the outlet.

9 Claims, 12 Drawing Sheets

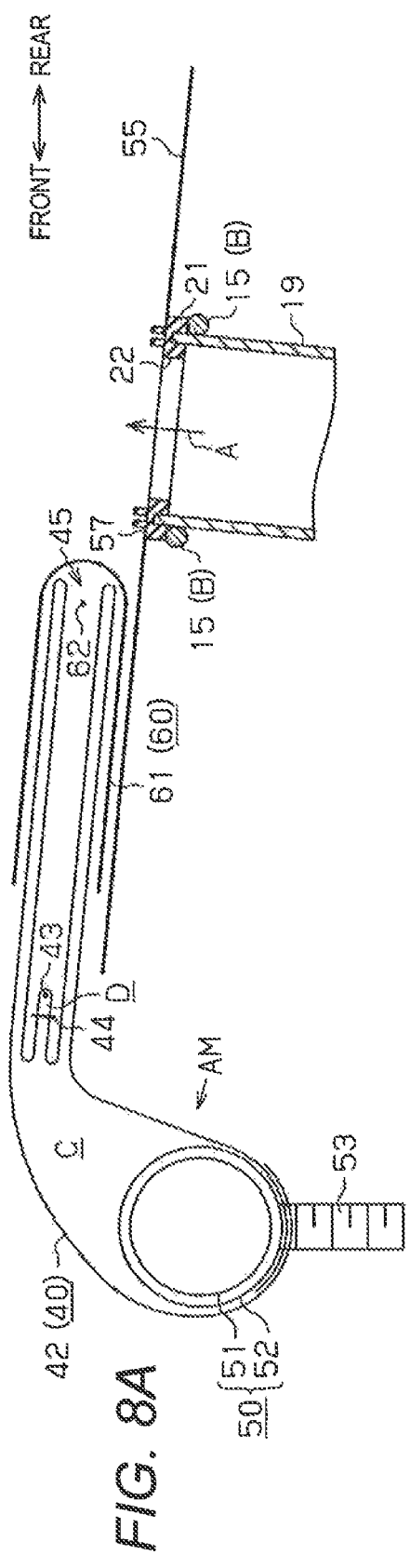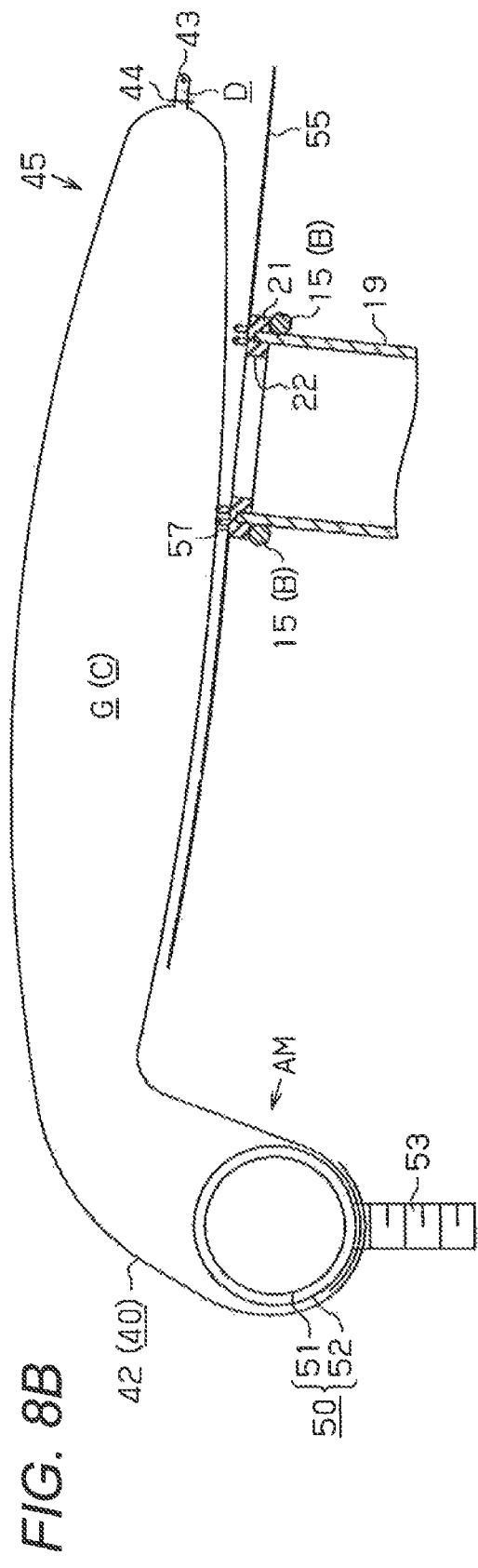

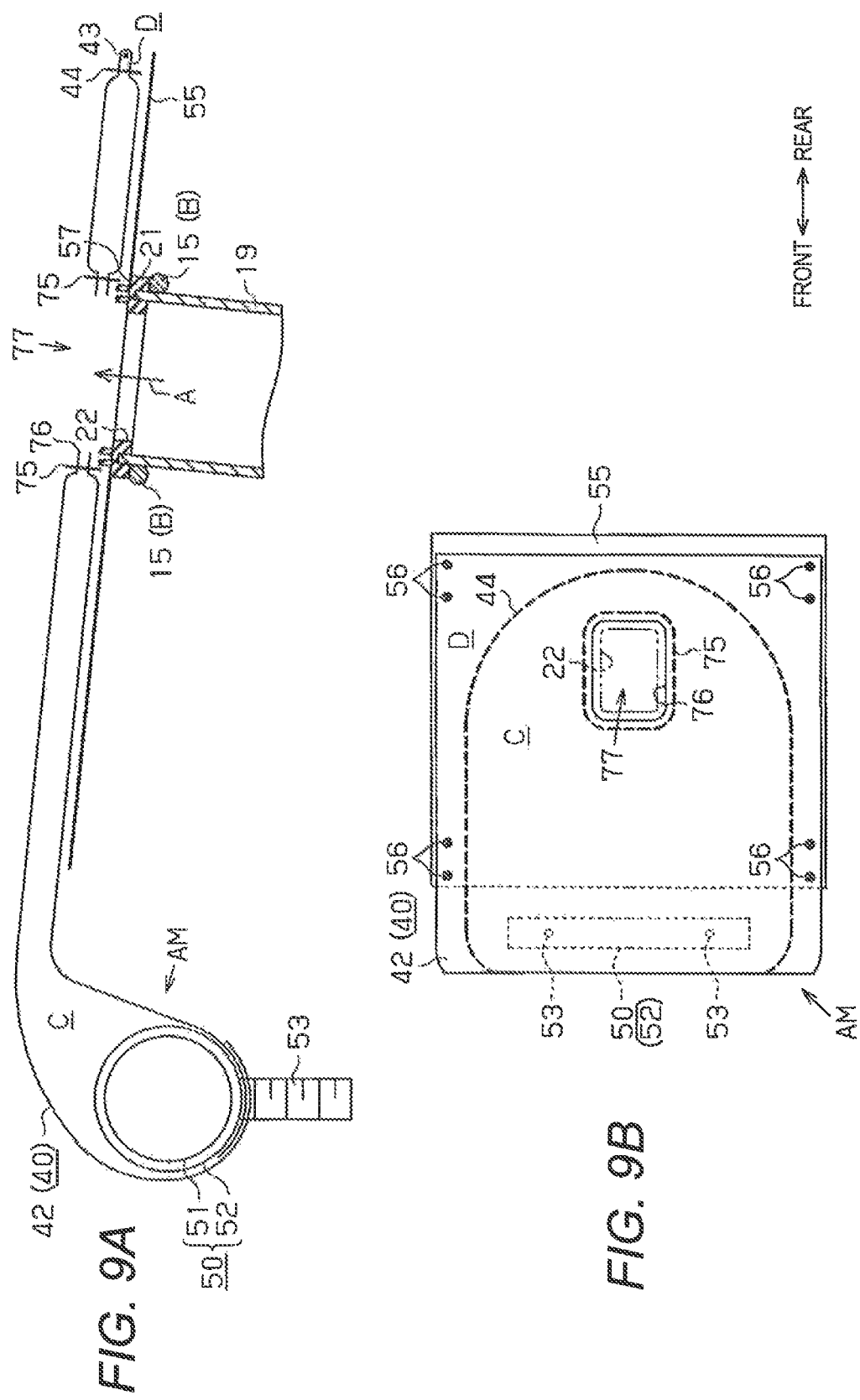

SEAT CUSHION AIRBAG DEVICE

BACKGROUND

1. Technical Field

The present invention relates to a seat cushion airbag device that suppresses a phenomenon where an object to be restrained on a seat section moves forward by inflating an airbag, which is disposed in a seat section of a vehicle seat, with an inflating fluid such as an inflating gas so that a seat surface is bulged out.

2. Background Art

There is a "vehicle seat air-conditioner" disclosed in, for example, Patent Document 1, as a technique that improves the comfort of an occupant seated in a vehicle seat. The vehicle seat air-conditioner is provided with a blower duct that includes an outlet provided below a seat cushion of a seat section, and ejects air-conditioning air (cold air, warm air, and the like), which flows in the blower duct, upward from the outlet. The air-conditioning air passes through the seat cushion and reaches an occupant, so that the occupant comfortably feels cool or warm.

Meanwhile, a phenomenon (submarine phenomenon) where the waist of an occupant, who is restrained in a vehicle seat by a seat belt device, comes out from a lap belt portion and moves forward (slides forward) when an impact is applied to a vehicle from the front by the front-end collision or the like becomes a problem in the vehicle. Accordingly, various measures are being taken or proposed for the suppression of the submarine phenomenon.

As one of the various measures, there is a seat cushion airbag device that is mountable to a vehicle seat including a seat section where a seat cushion is supported from below by a support section of a seat frame. The support section includes a spring member (wire frame part) that elastically supports the seat cushion from below, locking claws by which the spring member is caught, and the like.

In the seat cushion airbag device, an airbag in which an inflator (inflating fluid generation source) is built is disposed between the support section and the seat cushion (see Patent Documents 2 and 3). In general, the airbag is disposed while being deployed (without being folded). Further, the airbag is inflated with an inflating gas (inflating fluid) ejected from the inflator, so that a seat surface of the seat section is bulged out. Due to the bulge of the seat surface, a portion of a femoral region of the occupant near the back of a knee is pressed against the lap belt portion in the vertical direction. Accordingly, the restraining force of the lap belt portion is increased, so that the forward movement (forward slide) is restricted.

Patent Document 1: JP-A-11-48772
Patent Document 2: JP-A-2002-79861
Patent Document 3: JP-A-2005-306252

SUMMARY

Meanwhile, if the seat cushion airbag device is mounted to a vehicle seat in which the vehicle seat air-conditioner is assembled, the airbag, which is disposed (which is not folded), is positioned above the outlet at a certain position of the blower duct. In this case, the outlet is closed by the airbag, so that air-conditioning air does not reach the occupant. For this reason, there is a concern that comfort deteriorates.

The invention has been made in consideration of these circumstances, and an object of the invention is to provide a seat cushion airbag device that can suppress the forward movement of an object to be restrained on a seat section without inhibiting the ejection of air-conditioning air from an outlet.

A first aspect of the invention provides a seat cushion airbag device mountable to a vehicle seat, the vehicle seat including: a seat section including a seat cushion supported from below by a support section of a seat frame; and a blower duct having an outlet provided below the seat cushion, the vehicle seat being configured to eject air-conditioning air upward from the blower duct through the outlet, the seat cushion airbag device including an airbag, wherein at least a part of the airbag between the support section and the seat cushion is inflated with an inflating fluid generated from an inflating fluid generation source such that a seat surface of the seat section is bulged out, thereby suppressing a forward movement of an object to be restrained on the seat section, wherein the airbag includes a folded portion, wherein before the airbag is inflated with the inflating fluid, the airbag is disposed at a position on a front side of the outlet while the folded portion is folded, such that the outlet is exposed from the airbag, and wherein when the airbag is inflated, the folded portion is deployed so as to extend to a position on a rear side of the outlet.

According to the above-mentioned structure, the airbag is disposed between the support section and the seat cushion at the position on the front side of the outlet of the blower duct while the folded portion is folded before the airbag is inflated with the inflating fluid. For this reason, the outlet of the blower duct is not closed by the airbag. The air-conditioning air, which flows in the blower duct and is ejected upward from the outlet, passes through the seat cushion and reaches an occupant, so that the occupant comfortably feels cool or warm.

Meanwhile, when the inflating fluid is supplied to the airbag from the inflating fluid generation source in response to an impact applied to a vehicle, at least a part of the airbag is inflated with the inflating fluid between the support section and the seat cushion. The folded portion of the airbag is deployed (unfolded) so as to extend to a position beyond (on the rear side of) at least the outlet at the time of this inflation. Further, the seat surface of the seat section is bulged out by the airbag inflated as described above, so that the forward movement of the object to be restrained on the seat section (submarine phenomenon) is suppressed.

A second aspect of the invention provides the seat cushion airbag device according to the first aspect further including: a contact suppressing sheet which suppresses contact between the support section and the airbag when the folded portion is folded and which suppresses contact between the support section and the airbag when the folded portion is deployed.

According to the above-mentioned structure, the contact between the airbag and the support section is suppressed by the contact suppressing sheet not only in the case of the airbag of which the folded portion is folded but also in the case of the airbag of which the folded portion is deployed, that is, regardless of the state of the folded portion. As a result, the damage to the airbag, which is caused by the contact between the airbag and sharp portions of the support section, is suppressed.

A third aspect of the invention provides the seat cushion airbag device according to the first or second aspect further including: a wrapping sheet which wraps an object which is at least a part of the air bag in a state prior to inflation of the airbag, wherein the object includes at least the folded portion in a folded state.

According to the above-mentioned structure, the folded portion is folded before the airbag is inflated with the inflating fluid. However, since the folded portion is wrapped with the wrapping sheet, the folded portion is kept folded. For this reason, when the airbag is transported or before the airbag is mounted on the vehicle seat, the unfolding of the folded portion is suppressed.

A fourth aspect of the invention provides the seat cushion airbag device of any one of the first to third aspects, wherein the folded portion may be folded in any one form of inward folding, roll-folding, and bellows-folding.

Here, the inward folding is a folding aspect where an end portion of the airbag is folded back so as to be positioned on the inside of the rest thereof.

The roll-folding is a folding aspect where the other portion of the airbag is wound so as to spiral around one end portion of the airbag as a center.

The bellows-folding is a folding aspect where the airbag is folded back while the folding direction of the airbag is alternately changed at a constant width.

According to the above-mentioned structure, the airbag is disposed at the position on the front side of the outlet of the blower duct while the folded portion is folded in any one aspect of inward folding, roll-folding, and bellows-folding before the airbag is inflated with the inflating fluid.

When the inflating fluid is supplied to the airbag from the inflating fluid generation source in response to an impact applied to a vehicle, the folded portion, which is folded in the above-mentioned aspect, is inflated while being unfolded (deployed) between the support section and the seat cushion.

A fifth aspect of the invention provides a seat cushion airbag device mountable to a vehicle seat, the vehicle seat including: a seat section including a seat cushion supported from below by a support section of a seat frame; and a blower duct having an outlet provided below the seat cushion, the vehicle seat being configured to eject air-conditioning air upward from the blower duct through the outlet, the seat cushion airbag device including an airbag, wherein at least a part of the airbag between the support section and the seat cushion is inflated with an inflating fluid generated from an inflating fluid generation source such that a seat surface of the seat section is bulged out, thereby suppressing a forward movement of an object to be restrained on the seat section, wherein before the airbag is inflated with the inflating fluid, the airbag is deployed and is disposed between the support section and the seat cushion, and wherein the airbag includes a ventilation portion which allows the air-conditioning air ejected from the outlet to pass therethrough and which is formed at a portion to be positioned above the outlet.

According to the above-mentioned structure, before the airbag is inflated with the inflating fluid, the airbag is disposed between the support section and the seat cushion while being deployed. In this state, the ventilation portion, which is formed at the airbag and allows the air-conditioning air to pass, is positioned above the outlet. For this reason, the outlet of the blower duct is not closed by the airbag. The air-conditioning air, which flows in the blower duct and is ejected upward from the outlet, passes through the ventilation portion and the seat cushion while the flow of the air-conditioning air is not inhibited by the airbag. The air-conditioning air reaches an occupant, so that the occupant comfortably feels cool or warm.

Meanwhile, when an inflating fluid is supplied to the airbag from the inflating fluid generation source in response to an impact applied to a vehicle, the airbag is inflated with the inflating fluid between the support section and the seat cushion. The seat surface of the seat section is bulged out by the airbag, so that the forward movement (submarine phenomenon) of the object to be restrained on the seat section is suppressed.

A sixth aspect of the invention provides the seat cushion airbag device of the fifth aspect, wherein the airbag includes an annular partition wall portion formed at a part of the airbag, wherein an area surrounded by the partition wall portion may form a non-inflation area which is not supplied with the inflating fluid from the inflating fluid generation source and which is not inflated, and wherein the ventilation portion is be formed in the non-inflation area.

According to the above-mentioned structure, when the airbag is deployed and disposed between the support section and the seat cushion before being inflated with the inflating fluid, the annular partition wail portion formed at a part of the airbag is positioned above the outlet. Accordingly, the ventilation portion formed in the non-inflation area of the airbag, which is surrounded by the partition wall portion, is positioned above the outlet. For this reason, the air-conditioning air, which flows in the blower duct and is ejected upward from the outlet, passes through the ventilation portion of the airbag and the seat cushion in this order and reaches an occupant.

Meanwhile, when an inflating fluid is supplied to the airbag from the inflating fluid generation source in response to an impact applied to a vehicle, an outer area of the airbag outside the partition wall portion is inflated between the support section and the seat cushion. At this time, the non-inflation area surrounded by the partition wall portion is not supplied with the inflating fluid and is not inflated. Further, the seat surface of the seat section is bulged out by the airbag (excluding the non-inflation area).

A seventh aspect of the invention provides the seat cushion airbag device according to the fifth aspect, wherein the airbag includes: an inflation portion which is supplied with the inflating fluid from the inflating fluid generation source and is inflated; and a non-inflation portion which is not supplied with the inflating fluid and is not inflated, wherein the inflation portion is formed at a portion except the outlet, and wherein the ventilation portion is formed at a portion of the non-inflation portion positioned above the outlet.

According to the above-mentioned structure, when the airbag is deployed and disposed between the support section and the seat cushion before being inflated with the inflating fluid, the inflation portion is positioned at a portion avoiding the outlet. Further, the ventilation portion formed at the non-inflation portion is positioned above the outlet. For this reason, the air-conditioning air, which flows in the blower duct and is ejected upward from the outlet, passes through the ventilation portion of the non-inflation portion and the seat cushion in this order and reaches an occupant.

Meanwhile, when an inflating fluid is supplied to the airbag from the inflating fluid generation source in response to an impact applied to a vehicle, the inflation portion of the airbag is inflated with the inflating fluid at a portion avoiding the outlet between the support section and the seat cushion. The non-inflation portion of the airbag is not inflated. Moreover, the seat surface of the seat section is bulged out by the inflation portion.

A eighth aspect of the invention provides the seat cushion airbag device according to the seventh aspect, wherein the inflation portion includes a pair of inflation pieces positioned on both sides of the outlet in a width direction of the seat section, respectively; wherein the non-inflation portion includes a non-inflation piece which extends from an outer edge portion of the airbag toward the outlet and which is interposed between both the inflation pieces, and wherein the ventilation portion is formed at a portion of the non-inflation piece spaced apart from the outer edge portion of the airbag.

According to the above-mentioned structure, when the airbag is deployed and disposed between the support section and the seat cushion before being inflated with the inflating fluid, the pair of inflation pieces of the inflation portion are positioned on both sides of the outlet in the width direction of the seat section. Moreover, the non-inflation piece of the non-inflation portion, which extends from the outer edge portion of the airbag toward the outlet and is interposed between both the inflation pieces, is positioned above the outlet. Accordingly, the ventilation portion, which is formed at the portion of the non-inflation piece positioned above the outlet, is positioned at a portion that is spaced apart from the outer edge portion of the airbag. For this reason, the air-conditioning air, which flows in the blower duct and is ejected upward from the outlet, passes through the ventilation portion of the non-inflation portion and the seat cushion in this order and reaches an occupant.

Meanwhile, a part of the non-inflation piece of the non-inflation portion is positioned between the ventilation portion and the outer edge portion of the airbag. The pair of inflation pieces, which are positioned on both sides of the outlet in the width direction of the seat section, are connected to each other by the non-inflation piece. For this reason, the movement of both the inflation pieces in the direction where the space between the inflation pieces is widened is restricted by the non-inflation piece.

Meanwhile, when an inflating fluid is supplied to the airbag from the inflating fluid generation source in response to an impact applied to a vehicle, the pair of inflation pieces of the inflation portion of the airbag are inflated between the support section and the seat cushion at the portions that are positioned on both sides of the outlet in the width direction of the seat section. The rest of the inflation portion (a portion of the inflation portion except for the inflation pieces) is also inflated between the support section and the seat cushion. The non-inflation portion including the non-inflation piece of the airbag is not inflated. Further, the seat surface of the seat section is bulged out by the inflation portion that includes the pair of inflation pieces.

A ninth aspect of the invention provides the seat cushion airbag device according to the fifth aspect, wherein the airbag includes: an inflation portion which is supplied with the inflating fluid from the inflating fluid generation source and is inflated; and a non-inflation portion which is not supplied with the inflating fluid and is not inflated, wherein a cutout portion extending from an outer edge portion of the non-inflation portion to a portion positioned above at least the outlet is formed at the non-inflation portion, and wherein the ventilation portion is formed of a part of the cutout portion.

According to the above-mentioned structure, when the airbag is deployed and disposed between the support section and the seat cushion before being inflated with the inflating fluid, the inflation portion is positioned at a portion avoiding the outlet. Further, the cutout portion formed at the non-inflation portion is positioned above the outlet. Accordingly, the ventilation portion, which is formed of a part of the cutout portion, is positioned above the outlet. For this reason, the air-conditioning air, which flows in the blower duct and is ejected upward from the outlet, passes through the ventilation portion of the non-inflation portion and the seat cushion in this order and reaches an occupant.

Meanwhile, when an inflating fluid is supplied to the airbag from the inflating fluid generation source in response to an impact applied to a vehicle, the inflation portion of the airbag is inflated with the inflating fluid at a portion avoiding the outlet between the support section and the seat cushion. The non-inflation portion of the airbag is not inflated. Moreover, the seat surface of the seat section is bulged out by the inflation portion.

A tenth aspect provides a seat cushion airbag device mountable to a vehicle seat, the vehicle seat including: a seat section including a seat cushion supported from below by a support section of a seat frame; and a blower duct having an outlet provided below the seat cushion, the vehicle seat being configured to eject air-conditioning air upward from the blower duct through the outlet, the seat cushion airbag device including an airbag, wherein at least a part of the airbag between the support section and the seat cushion is inflated with an inflating fluid generated from an inflating fluid generation source such that a seat surface of the seat section is bulged out, thereby suppressing a forward movement of an object to be restrained on the seat section, wherein before the airbag is inflated with the inflating fluid, the airbag is deployed and is disposed at a position spaced apart from the outlet between the support section and the seat cushion, such that the outlet is exposed from the airbag, and wherein the airbag includes an upward inflation facilitating portions configured to facilitate the upward inflation of the airbag.

According to the above-mentioned structure, before the airbag is inflated with the inflating fluid, the airbag is disposed at a position, which is spaced apart from the outlet of the blower duct, between the support section and the seat cushion while being deployed. For this reason, the outlet of the blower duct is not closed by the airbag. The air-conditioning air, which flows in the blower duct and is ejected upward from the outlet, passes through the seat cushion and reaches an occupant, so that the occupant comfortably feels cool or warm.

Meanwhile, when the inflating fluid is supplied to the airbag from the inflating fluid generation source in response to an impact applied to a vehicle, at least a part of the airbag is inflated with the inflating fluid between the support section and the seat cushion. At this time, the upward inflation of the airbag is facilitated by the upward inflation facilitating portions that are formed at the airbag. Due to this facilitation, the airbag is inflated up to a high position as compared to a case where the upward inflation facilitating portions are not formed. Further, the seat surface of the seat section is bulged out by the inflated airbag, so that the forward movement (submarine phenomenon) of the object to be restrained on the seat section is suppressed.

A eleventh aspect of the invention provides the seat cushion airbag device according to the tenth aspect, wherein the airbag includes a pair of fabric portions provided to vertically overlap each other, wherein both the fabric portions are joined to each other by peripheral joints formed at peripheries of both the fabric portions, thereby forming a bag shape; wherein the fabric portions are joined by the peripheral joint in a state in which a part of both the fabric portions are folded to an inside of the rest thereof, and wherein the upward inflation facilitating portions is formed of the portions of the fabric portions which are folded inward.

According to the above-mentioned structure, before the airbag is inflated with the inflating fluid, a part of both the fabric portions enter the inside of the rest thereof as the upward inflation facilitating portions while being folded to the inside of the rest thereof. For this reason, the airbag is flat in the vertical direction.

Meanwhile, when an inflating fluid is supplied to the airbag from the inflating fluid generation source in response to an impact applied to a vehicle, the airbag is inflated between the support section and the seat cushion. At this time, the upward inflation facilitating portions, which have been folded, are unfolded and extend in the shape of a surface, so that the upward inflation of the airbag is facilitated.

A twelfth aspect of the invention provides the seat cushion airbag device according to the tenth aspect, wherein the airbag includes: a pair of main body fabric portions provided to vertically overlap each other; and a pair of intermediate fabric portions which serve as the upward inflation facilitating portion, and each of which is disposed between outer edge portions opposing each other of the main body fabric portions so as to connect the outer edge portions, wherein before the airbag is inflated with the inflating fluid, the intermediate fabric portions are folded such that both the main body fabric portions are disposed between the support section and the seat cushion so as to be close to each other.

According to the above-mentioned structure, since the intermediate fabric portions are folded as the upward inflation facilitating portions before the airbag is inflated with the inflating fluid, both the main body fabric portions are close to each other.

Meanwhile, when an inflating fluid is supplied to the airbag from the inflating fluid generation source in response to an impact applied to a vehicle, the airbag is inflated between the support section and the seat cushion. At this time, the intermediate fabric portions (upward inflation facilitating portions), which have been folded, are unfolded and extend in the shape of a surface, so that the upward inflation of the airbag (the inflation of the airbag in the direction where both the main body fabric portions are separated from each other in the vertical direction) is facilitated.

According to the seat cushion airbag device of the invention, an outlet of a blower duct is not closed by an airbag that is not yet inflated. Accordingly, it is possible to suppress the forward movement of an object to be restrained on a seat section without inhibiting the ejection of air-conditioning air from the outlet.

BRIEF DESCRIPTION OF THE DRAWINGS

FIGS. 8A and 8B show the first embodiment, in which FIG. 8A is a partial side cross-sectional view showing the seat cushion airbag device, of which the airbag is not yet inflated, together with a blower duct and FIG. 8B is a partial side cross-sectional view showing the seat cushion airbag device, of which the airbag is inflated, together with the blower duct.

FIGS. 9A and 9B show a second embodiment of the invention, in which FIG. 9A is a partial side cross-sectional view showing a seat cushion airbag device together with a blower duct and FIG. 9B is a plan view of the seat cushion airbag device.

FIGS. 11A and 11B show the third embodiment, in which FIG. 11A is a partial side cross-sectional view showing the seat cushion airbag device, of which the airbag is not yet inflated, together with a blower duct and FIG. 11B is a partial side cross-sectional view showing the seat cushion airbag device, of which the airbag is inflated, together with the blower duct.

FIG. 14 is a view showing a modification of the second embodiment, wherein

FIGS. 16A and 16B show the modification of the third embodiment, in which FIG. 16A is a cross-sectional view taken along line Y-Y of FIG. 15 and FIG. 16B is a cross-sectional view of the seat cushion airbag device of which the airbag of FIG. 16A is inflated.

DETAILED DESCRIPTION

First Embodiment

A first embodiment of the invention will be described below with reference to FIGS. 1 to 8.

Meanwhile, in the following description, a forward direction of a vehicle is described as front, and front, rear, up, down, left, and right are determined on the basis of this. Further, in each of the drawings, "front" means the front side of a vehicle, "rear" means the rear side of the vehicle, "inside" means the inside of the vehicle, and "outside" means the outside of the vehicle. The inside of the vehicle is the side close to a middle position in the width direction of the vehicle, and the outside of the vehicle is the side distant from the middle position.

The schematic structure of a vehicle seat S to which a seat cushion airbag device according to this embodiment is applied will be described first.

Figure 1:
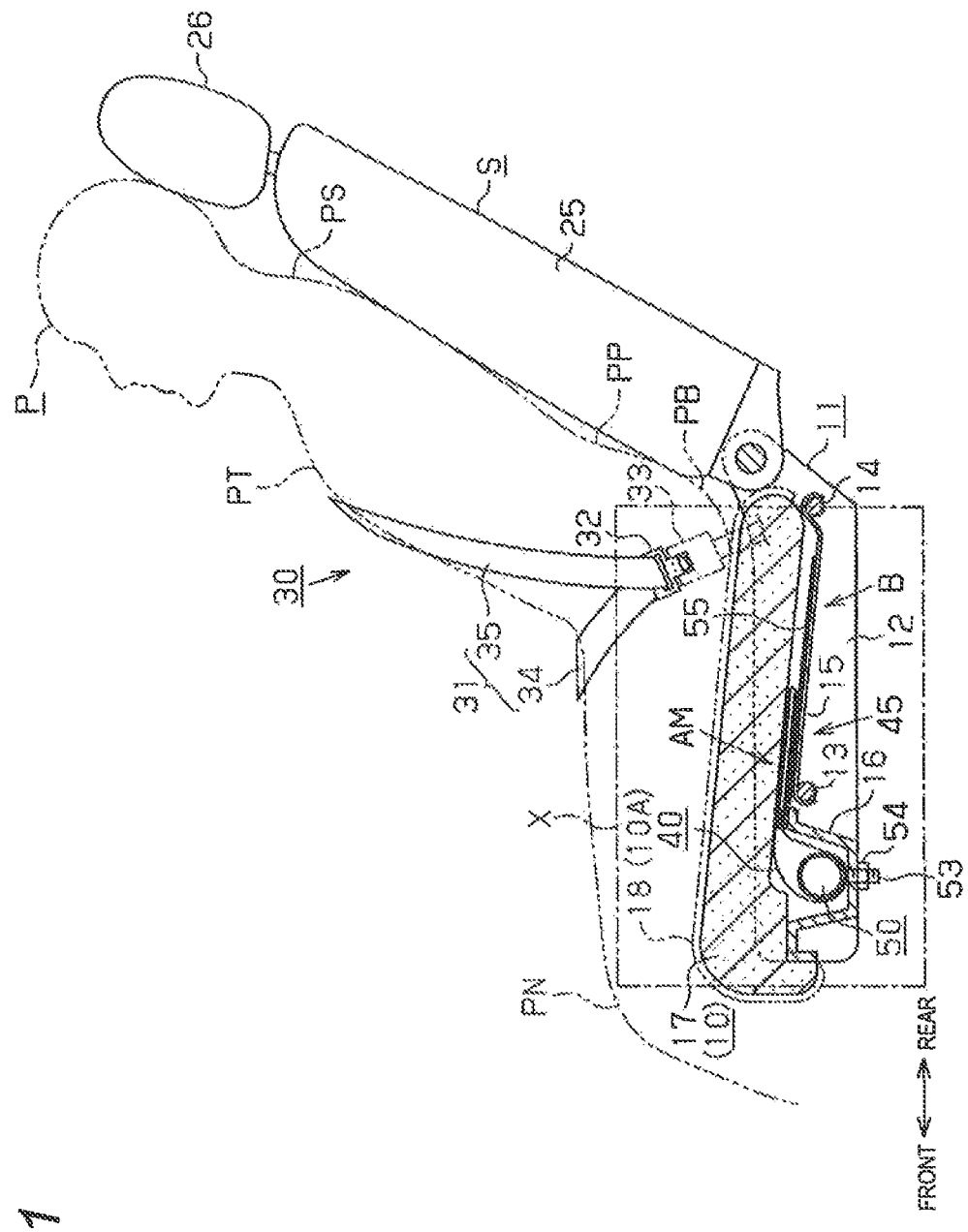
FIG. 1 is a view showing a first embodiment of the invention and is a side cross-sectional view showing a vehicle seat, to which a seat cushion airbag device is mounted, together with an occupant and a seat belt device.
Figure 2:
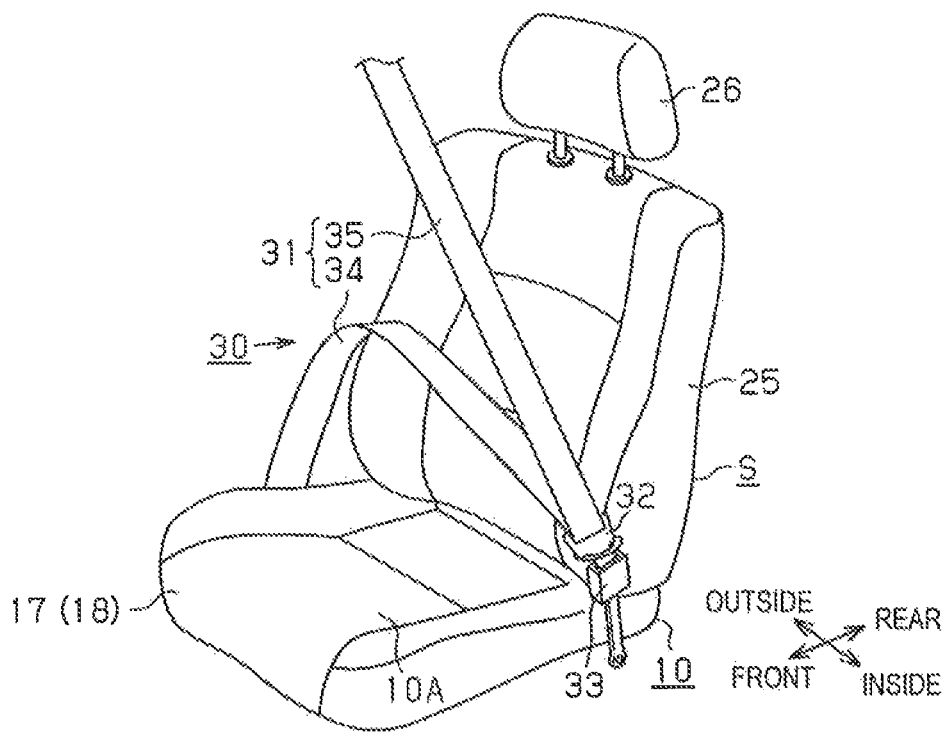
FIG. 2 is a view showing the first embodiment and is a perspective view showing a part of the seat belt device and the vehicle seat.

As shown in FIGS. 1 and 2, the vehicle seat S includes a seat section (seat cushion) 10, a backrest portion (seat back) 25 that is tiltably disposed at the rear end of the seat section 10, and a headrest 26 that is disposed at the upper portion of the backrest portion 25.

Figure 3:
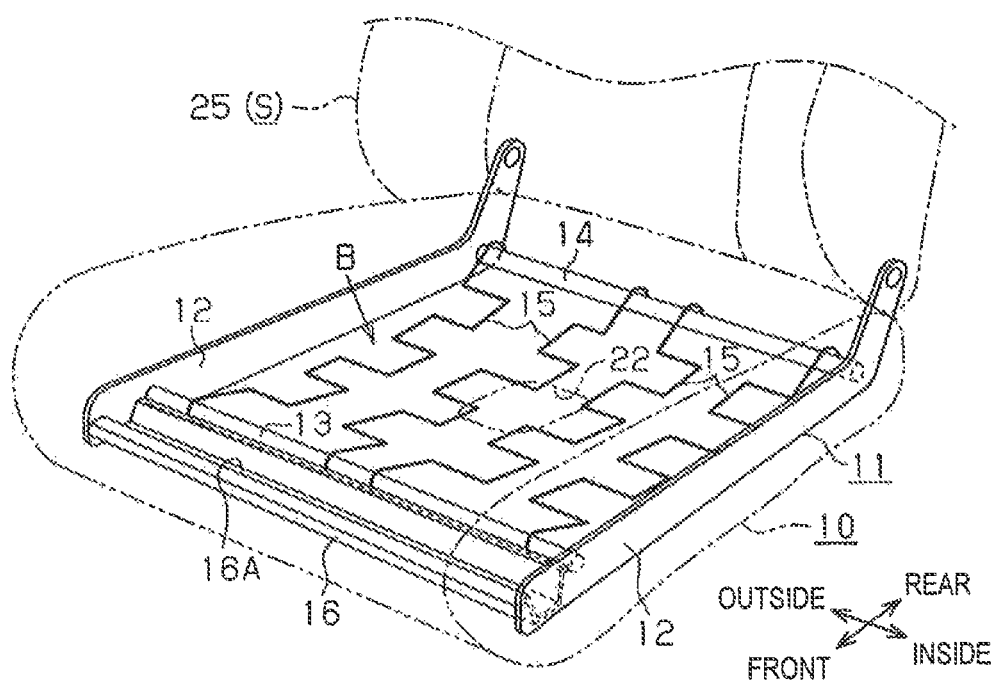
FIG. 3 is a view showing the first embodiment and is a partial perspective view showing a storage case and a seat frame of a vehicle seat.

The seat section 10 is a portion in which an object to be restrained by the seat cushion airbag device (an object to be restrained), that is, an occupant P is seated. As shown in FIG. 3, a seat frame 11, which forms a framework of the seat section 10, includes a pair of side frame parts 12, a pair of connecting frame parts 13 and 14, a plurality of wire frame parts 15, and a storage case 16. Both the side frame parts 12 are formed in the shape of a plate that extends in a longitudinal direction, and are disposed at positions that are spaced apart from each other in the width direction of the vehicle (lateral direction). Both connecting frame parts 13 and 14 are formed of rods extending in the width direction of the vehicle, and are installed between both the side frame parts 12 at positions that are spaced apart from each other in the longitudinal direction. The plurality of wire frame parts 15 function as tension springs for making a comfortable seat, and are bent in the shape of successive sigmoid curves. These wire frame parts 15 are disposed at positions that are spaced apart from each other in the width direction of the vehicle, and are provided between both the connecting frame parts 13 and 14. In more detail, the connecting frame parts 13 and 14 are provided with locking claws (not shown) and the wire frame parts 15 are caught by the locking claws. Further, the wire frame parts 15 and the locking claws form a support section B that supports a seat cushion 17 (to be described below) from below.

The storage case 16 is disposed adjacent to the front side of the connecting frame part 13, and extends in the width direction of the vehicle. The storage case 16 includes a storage recess 16A that extends in the width direction of the vehicle while the upper surface of the storage recess 16A is opened. The storage recess 16A is a portion where the front portion of an airbag module AM to be described below is stored. Both end portions of the storage case 16 in the width direction of the vehicle are fixed to both the side frame parts 12.

Figure 4:
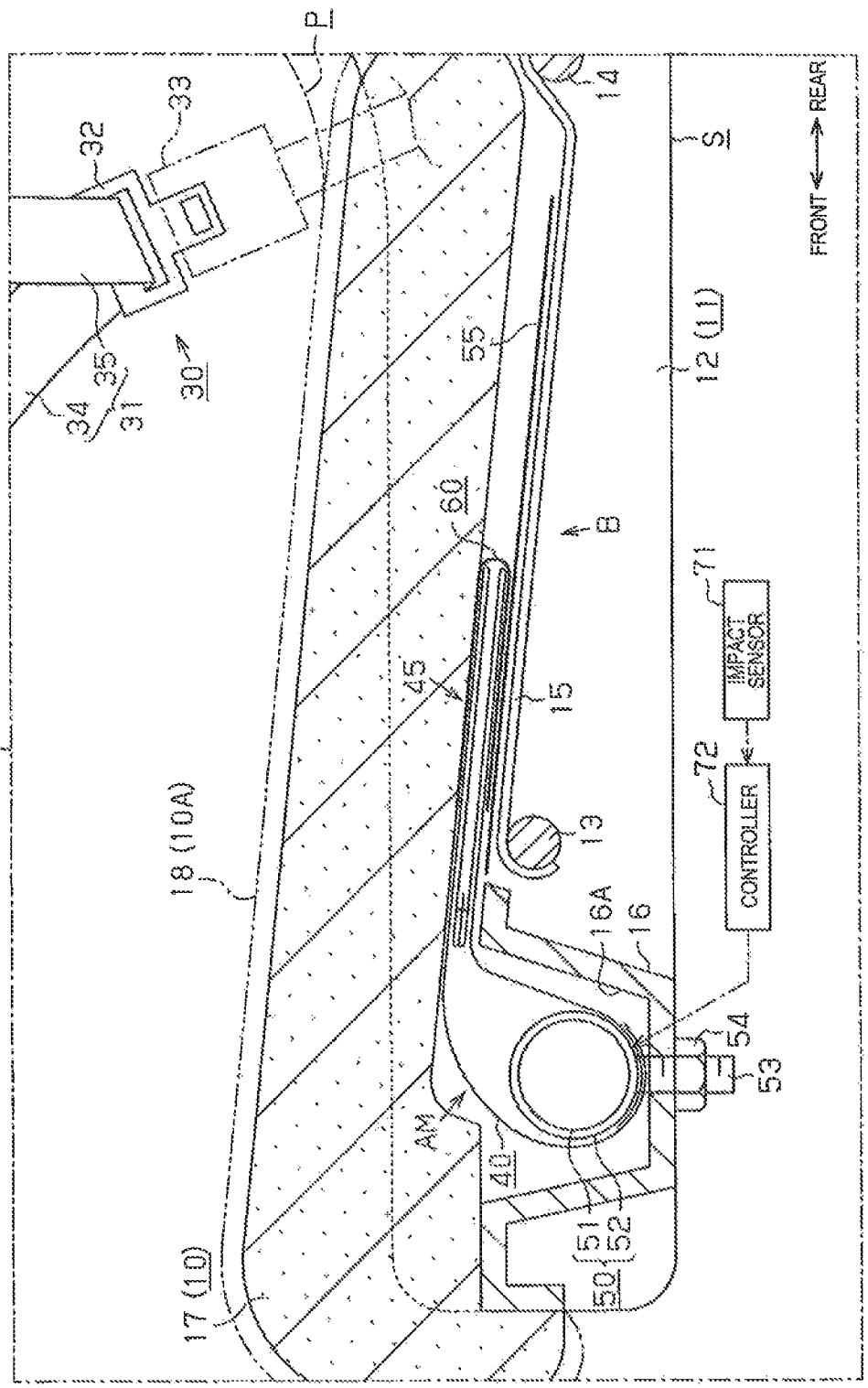
FIG. 4 is an enlarged partial side cross-sectional view of an X portion of FIG. 1.

As shown in FIG. 4, the seat cushion 17 is disposed on the seat frame 11. In other words, the seat cushion 17 is supported from below by the support section B of the seat frame 11. The seat cushion 17 is covered with a cover 18 that is made of fabric, leather, or the like.

As shown in FIG. 3 and FIGS. 8A and 8B, a blower (not shown) and a blower duct 19 that guides air-conditioning air A supplied from the blower to a seat surface 10A of the seat section 10 are provided below the seat cushion 17 in the seat section 10. The downstream portion of the blower duct 19 extends in a vertical direction, and the downstream end of the blower duct 19 is opened in the shape of a substantially quadrangular ring. A ring-like elastic member 21, which is made of an elastic material, such as rubber or an elastomer, in the shape of a substantially quadrangular ring, is mounted on the downstream end of the blower duct 19 from above. The ring-like elastic member 21 is positioned above the wire frame parts 15. An area, which is surrounded at the downstream end of the blower duct 19 by the ring-like elastic member 21, forms an outlet 22. Further, the air-conditioning air A supplied from the blower flows in the blower duct 19 and is ejected upward from the outlet 22.

The vehicle is provided with the following seat belt device 30 to restrain the occupant P seated in the vehicle seat S.

<Seat Belt Device 30>

As shown in FIGS. 1 and 2, the seat belt device 30 includes a belt-like webbing 31 that restrains the occupant P, a tongue 32 that is movable mounted on the webbing 31 in the longitudinal direction of the webbing 31, and a buckle 33 which is disposed on the inside of the seat section 10 in the width direction of the vehicle and on which the tongue 32 is detachably mounted. One end portion of the webbing 31 is fixed to the outside of the seat section 10 in the width direction of the vehicle, and the other end portion thereof is wound up by a belt winding device (not shown) that is disposed on the outside of the seat section 10 in the width direction of the vehicle. In the seat belt device 30, it is possible to change the lengths of a lap belt portion 34 and a shoulder belt portion 35 by making the tongue 32 slide on the webbing 31.

The lap belt portion 34 is a portion of the webbing 31 that reaches the end portion (fixed end) of the webbing 31 from the tongue 32, and passes from one side of a waist PP of the seated occupant P to the other side thereof via the front of the waist PP. The shoulder belt portion 35 is a portion of the webbing 31 that reaches the belt winding device from the tongue 32, and obliquely passes from a shoulder PS of the seated occupant P to the side of the waist PP via the front of a chest PT.

The vehicle is provided with a seat cushion airbag device (hereinafter, simply referred to as an airbag device) that suppresses a submarine phenomenon. The submarine phenomenon is a phenomenon where the waist PP of the occupant P restrained in the vehicle seat S by the seat belt device 30 comes out from the lap belt portion 34 and moves forward (slides forward) when an impact is applied to a vehicle by the front-end collision or the like.

The schematic structure of the airbag device is shown in FIG. 4. However, details are shown in FIG. 4. As shown in FIG. 4, the airbag device includes an airbag module AM, an impact sensor 71, and a controller 72.

The airbag module AM includes an airbag 40, an inflator assembly 50, a contact suppressing sheet 55, and a wrapping sheet 60. Next, the respective components of the airbag module AM will be described.

<Airbag 40>

Figure 5:
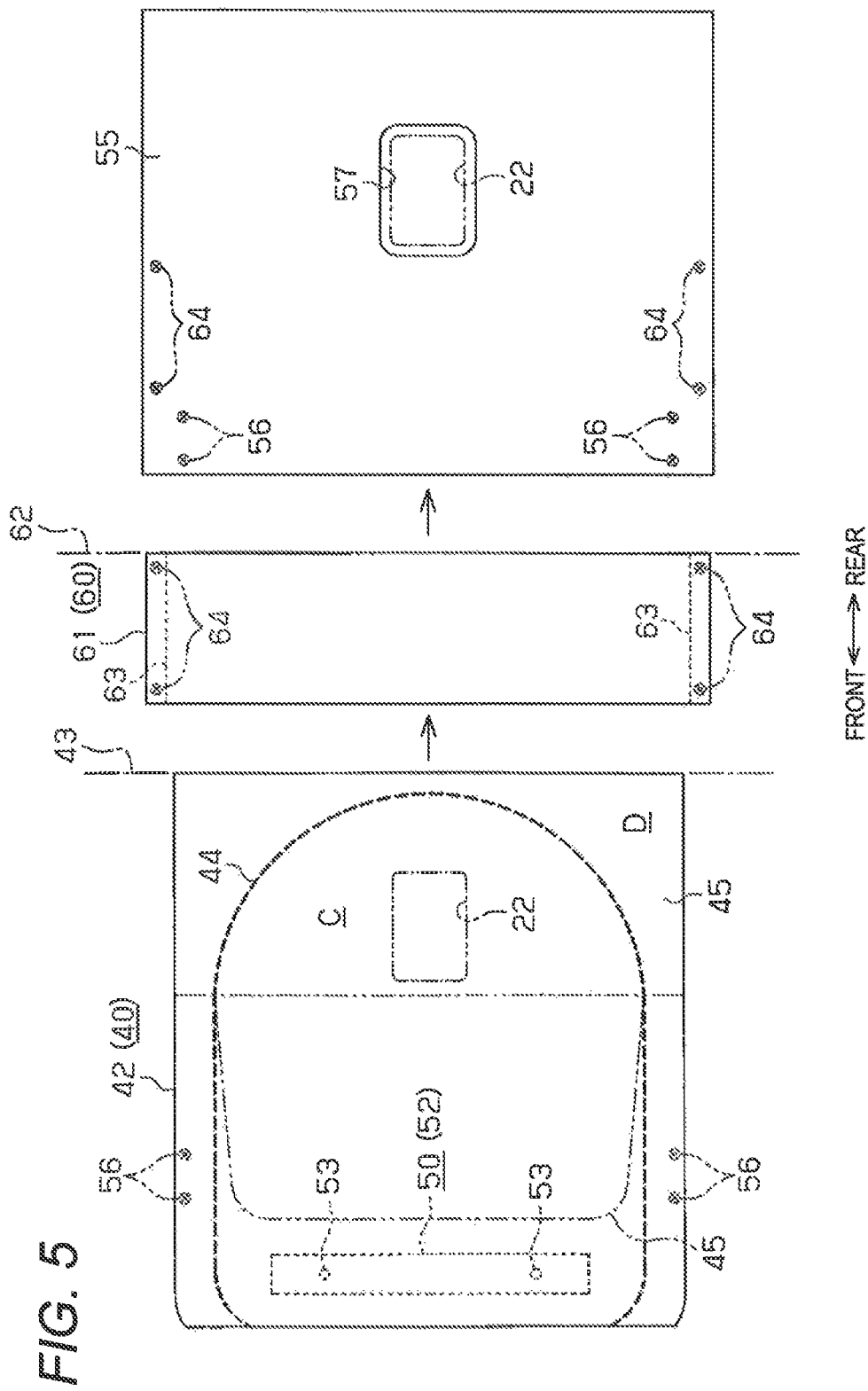
FIG. 5 is a view showing the first embodiment and is a plan view showing components of the seat cushion airbag device (an airbag, a wrapping sheet, and a contact suppressing sheet built in an inflator assembly).

The airbag 40 is to make the seat surface 10A of the seat section 10 bulge out by inflation. As shown in FIGS. 5 and 8A, the airbag 40 is formed in a bag shape by folding back a fabric (hereinafter, referred to as a "base fabric 42"), which is elongated in the longitudinal direction and has a rectangular shape in plan view, along a folding line 43 (see FIG. 7) set in the middle of the fabric so that the upper and lower portions of the fabric overlap each other; and joining (seaming in this embodiment) the upper and lower portions of the fabric at a peripheral joint 44.

The base fabric 42 is formed of a woven fabric that is made of polyester, polyamide, or the like. Accordingly, the base fabric 42 has high strength and flexibility. A portion (inner portion) of the airbag 40, which is surrounded by the peripheral joint 44, forms an inflation portion C that is supplied with an inflating gas G from an inflator 51 and is inflated. Further, a portion of the airbag 40 outside the peripheral joint 44 (a peripheral portion of the inflation portion C) forms a non-inflation portion D that is not supplied with the inflating gas G and is not inflated.

Furthermore, since the front end portion of the airbag 40 is not seamed, the harness of the inflator assembly 50, which is disposed at the front portion in the airbag 40, can be drawn to the outside of the airbag 40.

In this embodiment, the peripheral joint 44 is shown by a thick broken line and is distinguished from a normal broken line (hidden line) (see FIG. 5 and the like). A partition wall portion 75 (FIG. 9B), peripheral joints 86 (FIG. 10), and side edge joints 90 (FIG. 15), which will be described below, are also the same as described above.

The airbag 40 has such a size that the front end portion of the airbag 40 is positioned below a knee PN of the occupant P seated in the seat section 10 and the rear end portion of the airbag 40 is positioned below a hip PB in a state where the airbag 40 is not filled with the inflating gas G and is deployed in a planar shape so that the folding line 43 is positioned at the rear end portion of the airbag 40 (hereinafter, referred to as a "non-inflation deployment state") (see FIG. 1). Since the rear end portion of the airbag 40 is positioned at the rear portion of the seat section 10 as described above, the airbag 40 is long in the longitudinal direction of the vehicle and has a large volume.

A part (rear portion) of the airbag 40 forms a folded portion 45. The folded portion 45 is a portion that is positioned on the rear side of the front end of the outlet 22 of the blower duct 19 when the airbag 40 is in the non-inflation deployment state.

The folded portion 45 is folded before the inflation portion C of the airbag 40 is inflated. In the first embodiment, the folded portion 45 is folded in the folding aspect called "inward folding". The inward folding is a folding aspect where an end portion of the airbag 40, that is, the folded portion 45 in this case is folded back so as to be positioned on the inside of the rest thereof (a portion positioned on the front side of the folded portion 45). Since the folded portion 45 is folded inward as described above, the airbag 40 is compact so as to have a length shorter than the airbag 40, which is in the non-inflation deployment state, in the longitudinal direction.

<Inflator Assembly 50>

The inflator assembly 50 is to supply the inflating gas G as an inflating fluid to the airbag 40, and includes an inflator 51 that serves as an inflating fluid generation source and a retainer 52 that covers the inflator 51.

The inflator 51 has a substantially columnar shape, and a gas generating agent (not shown) is stored in the inflator 51. The inflating gas G is generated in this type (pyro-type) inflator 51 by the chemical reaction of the gas generating agent accompanying heat generation. The inflator 51 is provided with a gas ejection port (not shown) through which the generated inflating gas G is ejected. Harness (not shown), which forms a wire through which a control signal is sent to the inflator 51, is connected to one end portion of the inflator 51.

Meanwhile, another type inflator different from the pyro-type inflator may be used as the inflator 51. A stored gas type inflator where a partition wall of a high-pressure gas cylinder filled with a high-pressure gas is fractured by gunpowder or the like and an inflating gas (G is ejected or a hybrid type inflator that is the combination of the stored gas type inflator and the pyro-type inflator may be used as such a type of inflator.

Meanwhile, a major portion of the retainer 52 is formed substantially in the shape of a cylinder, which is elongated in the width direction of the seat section 10 (vertical direction in FIG. 5), by the bending or the like of a plate material such as a metal plate. Bolts 53, which extend downward, are fixed to the lower surface of the retainer 52 at a plurality of positions that are spaced apart from each other in the width direction of the seat section 10.

Meanwhile, the inflator 51 may be integrated with the retainer 52.

<Locking Aspect of Inflator Assembly 50 to Airbag 40>

The inflator assembly 50 is disposed at the front portion in the airbag 40 so as to extend in the width direction of the seat section 10. Each of the bolts 53 of the retainer 52 is inserted into the front lower portion of the airbag 40. The inflator assembly 50 is locked in the airbag 40 by this insertion. Each of the bolts 53 is exposed downward from the front lower portion of the airbag 40.

<Contact Suppressing Sheet 55>

As shown in FIG. 4, the contact suppressing sheet 55 is to suppress the contact between the support section B and the airbag 40 of which the folded portion 45 is folded, and to suppress the contact between the support section B and the airbag 40 of which the folded portion 45 is deployed. The contact suppressing sheet 55 is disposed on the support section B. The contact suppressing sheet 55 is to suppress the contact between the airbag 40 and the portions of the support section B, particularly, sharp portions such as portions of the wire frame parts 15, which are to be caught by the locking claws, as an object of which the contact with the airbag 40 is to be suppressed.

The contact suppressing sheet 55 is formed of one sheet. A sheet, which is formed by laminating a felt on a soft resin sheet made of a synthetic resin such as polyethylene, is used as the contact suppressing sheet 55 in this embodiment. The felt is formed in the shape of a fabric by the tangling of fiber itself without the weaving and knitting of fiber, and is high in flexibility.

As shown in FIGS. 4 and 5, the contact suppressing sheet 55 has a rectangular shape in plan view and a width substantially equal to the width of the airbag 40 (in the first embodiment, a width slightly larger than the width of the airbag 40). Further, the front end portion of the contact suppressing sheet 55 is positioned near the rear of the upper end portion of the storage case 16, and the rear end portion thereof is positioned at the rear portion of the seat cushion 17. The rear end portion of the contact suppressing sheet 55 is positioned at the same position as the rear end portion of the inflated airbag 40 or at a position slightly on the rear side of the rear end portion of the inflated airbag 40 in the longitudinal direction.

Figure 6:
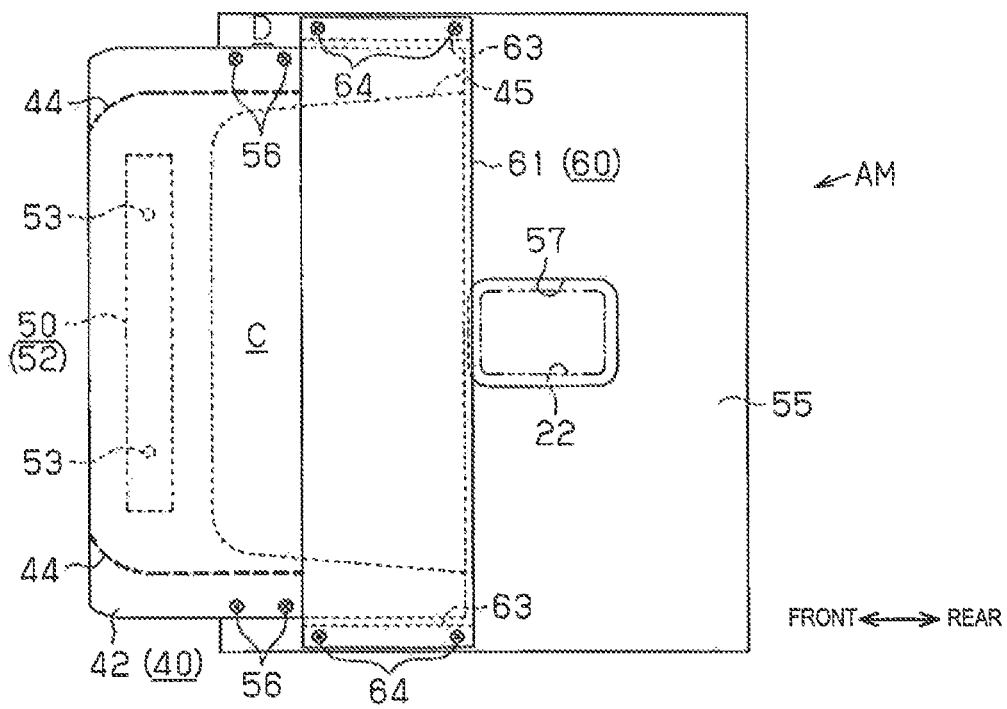
FIG. 6 is a plan view of the seat cushion airbag device according to the first embodiment.
Figure 7:
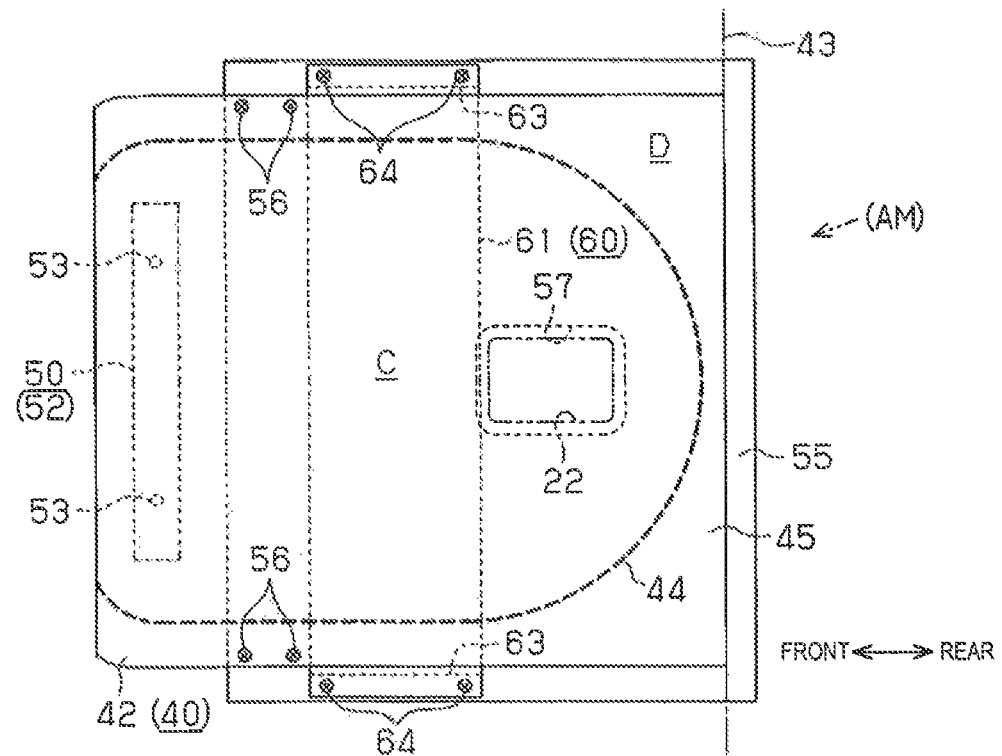
FIG. 7 is a view showing the first embodiment and is a plan view of the seat cushion airbag device of which a folded portion of the airbag is not yet folded and not yet wrapped with the wrapping sheet.

The contact suppressing sheet 55 is disposed in a posture where the felt faces the upper side (airbag 40) and the resin sheet faces the lower side (support section B). Moreover, as shown in FIGS. 5 to 7, the contact suppressing sheet 55 is joined to a plurality of points 56 of the non-inflation portion D of the airbag 40 by thermal welding. When the thermal welding is performed, the contact suppressing sheet 55 is disposed below the airbag 40. Further, the portions of the contact suppressing sheet 55, which correspond to the plurality of points 56, are heated and pressurized, so that the above-mentioned portions of the contact suppressing sheet are melted and firmly joined to the non-inflation portion D of the airbag 40.

A substantially quadrangular vent 57, which is slightly larger than the outlet 22, is formed at a portion of the contact suppressing sheet 55 that is positioned above the outlet 22 of the blower duct 19.

<Wrapping Sheet 60>

The wrapping sheet 60 is to wrap at least the folded portion 45, which is folded, as an object to be wrapped; to wrap the object before the inflation of the airbag 40; and to keep the folded portion 45 folded while the airbag module AM is transported, before the airbag module AM is mounted on the vehicle seat S, or the like.

The wrapping sheet 60 is formed using one substantially rectangular fabric (nonwoven fabric in the first embodiment) 61, which is made of a flexible material, in the shape of a bag of which the front end is opened (see FIG. 8). The wrapping sheet 60 has a dimension substantially equal to the dimension of the above-mentioned contact suppressing sheet 55 in the width direction of the seat section 10.

The bag-like wrapping sheet 60 is formed by folding the fabric 61 in half along a folding line 62 (see FIGS. 5 and 8A), which is set in the middle of the fabric 61 in the longitudinal direction of the fabric 61 so as to extend in the width direction of the seat section 10, so that the upper and lower portions of the fabric 61 overlap each other; and joining the upper and lower portions of the fabric 61 at a periphery. In more detail, the upper and lower portions of the fabric 61, which is folded in half, are joined to each other along a pair of side edge joints 63 that are set so as to extend in the longitudinal direction on both sides in the width direction of the seat section 10. The side edge joints 63 are formed by means, such as seaming, adhesion, or welding. These side edge joints 63 are formed at the outer portions of the folded portion 45, which is folded, in the width direction of the seat section 10 (see FIGS. 6 and 7).

The wrapping sheet 60 is disposed slightly on the front side of the outlet 22 of the blower duct 19 in the longitudinal direction. The wrapping sheet 60 is joined to the contact suppressing sheet 55 by thermal welding at points 64 outside the side edge joints 63 in the width direction of the seat section 10.

Further, the rear portion of the airbag 40 of which the folded portion 45 is folded inward as described above is inserted into the wrapping sheet 60 from the front (see FIGS. 6 and 8A). The rear portion of the folded portion 45 that is folded and portions of the airbag 40 that are positioned above and below the folded portion 45 are wrapped with the wrapping sheet 60 due to this insertion.

Meanwhile, the wrapping sheet 60 is provided with a portion (not shown) to be fractured that is pressed and fractured by the inflated airbag 40 when the airbag 40 is inflated. The portion to be fractured is formed of, for example, a slit formed on the wrapping sheet 60.

The airbag module AM, which includes the airbag 40 of which the folded portion 45 is folded inward as described above, the inflator assembly 50, the contact suppressing sheet 55, and the wrapping sheet 60, is disposed and assembled in the seat section 10 of the vehicle seat S in the following aspect.

<Disposition Aspect of Airbag Module AM>

As shown in FIGS. 4 and 8A, the airbag module AM is disposed so that the front portion of the airbag 40 where the inflator assembly 50 is disposed is stored in the storage recess 16A of the storage case 16. Since the airbag module AM is disposed as described above, the contact suppressing sheet 55 is disposed in a large area, which reaches a position close to the rear end portion of the seat section 10 from the vicinity of the rear of the storage recess 16A, on the support section B. The vent 57 of the contact suppressing sheet 55 is positioned above the outlet 22 of the blower duct 19. The folded portion 45 of the airbag 40 that is folded inward and the wrapping sheet 60 that wraps the folded portion 45 are positioned on the front side of the outlet 22.

<Assembly Aspect of Airbag Module AM>

Each of the bolts 53, which is exposed downward from the front lower portion of the airbag 40, is inserted into the bottom of the storage recess 16A. Further, a nut 54 is screwed to each of the bolts 53, so that the inflator assembly 50 is fastened to the storage recess 16A together with the airbag 40.

As described above, the airbag device includes the impact sensor 71 and the controller 72, which are shown in FIG. 4, in addition to the airbag module AM. The impact sensor 71 is formed of an acceleration sensor or the like, is mounted on a front bumper (not shown) or the like of a vehicle, and detects the impact applied to the front bumper or the like from the front in order to detect the front-end collision of the vehicle. The controller 72 controls the operation of the inflator 51 on the basis of a detection signal sent from the impact sensor 71.

The airbag device according to the first embodiment is formed as described above. Next, the operation of the airbag device will be described.

When an impact is not applied to a vehicle from the front by the front-end collision or the like, a command signal for operating the inflator 51 is not output to the inflator 51 from the controller 72 and the inflating gas G is not supplied to the airbag 40 from the inflator 51 in the airbag device. As shown in FIGS. 1 and 4, the folded portion 45 of the airbag 40 is folded inward and continues to be disposed between the support section B and the seat cushion 17 while being wrapped with the wrapping sheet 60. Since the folded portion 45 is wrapped with the wrapping sheet 60, the folded portion 45 is kept folded inward. Accordingly, the folded portion 45 is not easily unfolded.

As shown in FIG. 8A, the airbag 40 and the wrapping sheet 60 are positioned on the front side of the outlet 22 of the blower duct 19. For this reason, the outlet 22 is not closed by the airbag 40 and the wrapping sheet 60. Further, the contact suppressing sheet 55 is disposed on the support section B while being deployed in a planar shape without being folded. However, the vent 57 is positioned above the outlet 22. For this reason, the outlet 22 is also not closed by the contact suppressing sheet 55. The air-conditioning air A, which flows in the blower duct 19 and is ejected upward from the outlet 22, passes through the seat cushion 17 and reaches the occupant P. The occupant P comfortably feels cool or warm from the air-conditioning air A.

Furthermore, at this time, the contact between the airbag 40 and the support section B is suppressed by the contact suppressing sheet 55. The damage to the airbag 40 caused by the contact between the airbag 40 and the support section B, particularly, sharp portions such as portions of the wire frame parts 15, which are to be caught by the locking claws, is suppressed.

When an impact is applied to a vehicle from the front by the front-end collision or the like of the vehicle, the occupant P tends to be moved forward by the inertia. The occupant P is kept on the seat section 10 by a holding action of the seat belt device 30. However, in a certain posture of the occupant P, the waist PP may come out from the lap belt portion 34 and move forward.

However, when an impact having a predetermined value or more is applied to the vehicle by the impact applied from the front and the impact is detected by the impact sensor 71, a command signal for operating the inflator 51 is output to the inflator 51 from the controller 72 through the harness on the basis of a detection signal of the impact sensor 71. In response to this detection signal, a high-pressure inflating gas G is generated and ejected by the inflator 51.

Further, as the inflating gas G ejected from the inflator 51 is supplied to the airbag 40, the airbag 40 (inflation portion C) is inflated between the support section B and the seat cushion 17 as shown in FIG. 8B. The wrapping sheet 60, which is pressed by the inflated airbag 40, is fractured at the portion to be fractured. Meanwhile, the fractured wrapping sheet 60 is shown in FIG. 5B. Even after that, the airbag 40 is gradually inflated (deployed and inflated) rearward from the front portion thereof, which is a portion close to the inflator 51, while the folded portion 45 is deployed (unfolded) to the position beyond the outlet 22.

The seat cushion 17 is pushed up by the deployed and inflated airbag 40, so that the seat surface 10A of the seat section 10 is bulged out. An area, which reaches the hip PB from the back of the knee PN of the occupant P restrained in the vehicle seat S by the seat belt device 30, is pressed upward by the seat surface 10A that has been bulged out. Particularly, the waist PP of the occupant P, who has been pushed up through this pressing, is pressed against the lap belt portion 34 of the seat belt device 30, so that the restraining force of the lap belt portion 34 is increased. A phenomenon (submarine phenomenon) where the waist PP of the occupant P moves forward on the seat section 10 is suppressed. In particular, since the airbag 40 is gradually inflated rearward from the front portion thereof as described above, the seat surface 10A is also gradually bulged out so as to correspond to the inflation of the airbag. Accordingly, the seated occupant P lifts from the knee PN. For this reason, the generation of a submarine phenomenon is suitably suppressed.

Furthermore, when the folded portion 45 is inflated while being deployed as described above, the contact between the folded portion 45 and the support section B is suppressed by the contact suppressing sheet 55 like at the time of the non-inflation of the folded portion 45. Accordingly, the damage to the folded portion 45 caused by the contact between the folded portion 45 and sharp portions such as portions of the wire frame parts 15, which are to be caught by the locking claws, is suppressed.

Meanwhile, since the contact suppressing sheet 55 is disposed on the support section B while being deployed in a planar shape without being folded, the deployment and inflation of the folded portion 45 are hardly inhibited as compared to a case where the contact suppressing sheet 55 is deployed together with the folded portion 45 of the airbag 40.

Here, a portion (upper portion), which faces the airbag 40, of the contact suppressing sheet 55, which is disposed between the airbag 40 and the support section B, is formed of a felt. The felt is higher in flexibility than the resin sheet and the like, though not as much as the base fabric 42 of the airbag 40. For this reason, the flexibility of the contact suppressing sheet 55 is ensured, so that the contact suppressing sheet 55 is apt to be bent following the inflation of the airbag 40. For this reason, the contact suppressing sheet 55 inhibits the inflation of the airbag 40 less.

Further, a portion (lower portion) of the contact suppressing sheet 55, which faces the support section B, is formed of a soft resin sheet. The strength of resin sheet is higher than that of a felt or the like. For this reason, the soft resin sheet of the contact suppressing sheet 55 comes into contact with the support section B, so that the contact between the airbag 40 and the support section B is suitably suppressed during the inflation of the airbag 40.

Furthermore, since the soft resin sheet has flexibility though not as much as the fabric, the felt, and the like, the soft resin sheet is bent following the inflation of the airbag 40. For this reason, the contact suppressing sheet 55 less inhibits the inflation of the airbag 40.

According to the first embodiment that has been described above in detail, the following advantages are obtained.

(1) An object to which the invention is applied is the vehicle seat S that is provided with the blower duct 19 including the outlet 22 provided below the seat cushion 17 and ejects air-conditioning air A flowing in the blower duct 19 upward from the outlet 22. A part of the airbag 40 forms the folded portion 45, and the airbag 40 is disposed at the position on the near side of the outlet 22 (on the front side of the outlet 22) while the folded portion 45 is folded before the airbag 40 is inflated with the inflating gas G. Further, the folded portion 45 is deployed to the position beyond the outlet 22 when the airbag 40 is inflated (FIGS. 8A and 8B).

For this reason, it is possible to prevent the outlet 22 of the blower duct 19 from being closed by the airbag 40 that is not yet inflated. As a result, it is possible to suppress a phenomenon (submarine phenomenon) where the waist PP of the occupant P moves forward (slides forward) on the seat section 10, without inhibiting the ejection of the air-conditioning air A from the outlet 22.

(2) The contact suppressing sheet 55, which suppresses the contact between the support section B and the airbag 40 of which the folded portion 45 is folded and the contact between the support section B and the airbag 40 of which the folded portion 45 is deployed, is disposed at least between the airbag 40 and the support section B (FIG. 4).

For this reason, it is possible to suppress the contact between the airbag 40 and the support section B by the contact suppressing sheet 55 not only in the case of the airbag of which the folded portion 45 is folded but also in the case of the airbag 40 of which the folded portion 45 is deployed, that is, regardless of the state of the folded portion 45. As a result, it is possible to suppress the damage to the airbag 40 that is caused by the contact between the airbag 40 and sharp portions of the support section B.

Further, the contact suppressing sheet 55 forms one component of the airbag module AM and is easily handled since being joined to the airbag 40 (non-inflation portion D). It is possible to dispose the contact suppressing sheet 55 at a predetermined position on the support section B by disposing the airbag module AM so that the front portion of the airbag 40 is stored in the storage recess 16A of the storage case 16 when assembling the airbag module AM.

(3) The folded portion 45, which is folded, is wrapped with the wrapping sheet 60 (FIGS. 4 and 8A).

For this reason, it is possible to keep the folded portion 45 folded before the inflation of the airbag 40, and to suppress the unfolding of the folded portion 45 when the airbag module AM is transported, before the airbag module AM is mounted on the vehicle seat S, or the like.

Moreover, the wrapping sheet 60 forms one component of the airbag module AM and is easily handled since being joined to the airbag 40 (non-inflation portion D). It is possible to dispose the wrapping sheet 60 at a predetermined position by disposing the airbag module AM so that the front portion of the airbag 40 is stored in the storage recess 16A of the storage case 16 when assembling the airbag module AM.

(4) The folded portion 45 is folded inward (FIG. 8A).

For this reason, it is possible to make the folded portion 45 be folded by only performing a simple work for folding back the folded portion 45 so that the folded portion 45 is positioned on the inside of the rest of the airbag 40 (a portion positioned on the front side of the folded portion 45). Further, it is possible to make the airbag 40 be compact so that the longitudinal length of the airbag 40 is shorter than the longitudinal length of the airbag that is in the non-inflation deployment state.

Second Embodiment

Next, a second embodiment of the invention will be described with reference to FIGS. 9A and 9B.

The second embodiment is different from the first embodiment in terms of the following two points.

(i) Before an airbag 40 is inflated with an inflating gas C the airbag 40 is disposed between a support section B and a seat cushion 17 while being deployed (non-inflation deployment state). The airbag 40 is the same as the airbag 40 that is in the non-inflation deployment state described in the first embodiment.

(ii) A ventilation portion, which allows air-conditioning air A ejected from an outlet 22 to pass, is formed at a portion, which is positioned above the outlet 22 of a blower duct 19, of an inflation portion C of the airbag 40 that is in the non-inflation deployment state. In more detail, a substantially quadrangular ring-shaped partition wall portion 75, which is slightly larger than the outlet 22, is formed at a position, which is positioned above the outlet 22, of the airbag 40 that is in the non-inflation deployment state. The partition wall portion 75 is formed by seaming a base fabric 42, which is folded in half as described above, in the same way as the peripheral joint 44. An area of the airbag 40, which is surrounded by the partition wall portion 75, forms a non-inflation area 77 that is not supplied with the inflating gas G from an inflator 51 and is not inflated. A substantially quadrangular hole 76, which is slightly smaller than the partition wall portion 75 and slightly larger than the outlet 22, is formed in the non-inflation area 77, and the ventilation portion is formed of the hole 76.

Here, since the airbag 40 is not folded without the folded portion 45 unlike in the first embodiment, the wrapping sheet 60 is not used.

Further, the airbag 40, which is in the non-inflation deployment state, is joined to a contact suppressing sheet 55 at points 56, of which the number is larger than that of the first embodiment, by thermal welding.

Meanwhile, in the second embodiment, the same elements as the elements described in the above-mentioned first embodiment will be denoted by the same reference numerals and the repeated description thereof will be omitted.

The airbag device according to the second embodiment is formed as described above. Next, the operation of the airbag device will be described mainly in terms of the difference between the first embodiment and the second embodiment.

When an impact is not applied to a vehicle from the front by the front-end collision or the like and an inflating gas G is not supplied to the airbag 40 (inflation portion C) from the inflator 51, the airbag 40 is disposed between the support section B and the seat cushion 17 while being in the non-inflation deployment state. In this state, the substantially quadrangular ring-shaped partition wall portion 75, which is formed at the airbag 40 (inflation portion C), is positioned above the outlet 22. Accordingly, the ventilation portion (hole 76), which is formed in the non-inflation area 77 of the airbag 40 (inflation portion C) surrounded by the partition wall portion 75, is positioned above the outlet 22. For this reason, the outlet 22 of the blower duct 19 is not closed by the airbag (inflation portion C). Further, the contact suppressing sheet 55 is disposed on the support section B while being deployed in a planar shape without being folded. However, the vent 57 is positioned above the outlet 22. For this reason, the outlet 22 is also not closed by the contact suppressing sheet 55.

The air-conditioning air A, which flows in the blower duct 19 and is ejected upward from the outlet 22, passes through the seat cushion 17 via the vent 57 and the ventilation portion (hole 76) in this order while the flow of the air-conditioning air A is not inhibited by the airbag 40 or the contact suppressing sheet 55; and reaches an occupant P. The occupant P comfortably feels cool or warm from the air-conditioning air A.

Meanwhile, when a high-pressure inflating gas G is supplied to the airbag 40 (inflation portion C) from the inflator 51 in response to the impact applied to the vehicle, the airbag 40 (inflation portion C) is inflated with the inflating gas G between the support section B and the seat cushion 17. The non-inflation area 77 of the airbag 40 (inflation portion C), which is surrounded by the partition wall portion 75, is not inflated. Further, the seat cushion 17 is pushed up by the airbag 40 (inflation portion C) that is inflated as described above, so that the seat surface 10A of the seat section 10 is bulged out.

In particular, since the airbag 40 is gradually inflated rearward from the front portion thereof that is the portion close to the inflator 51, the seat surface 10A is also gradually bulged out so as to correspond to the inflation of the airbag. Accordingly, the seated occupant P lifts from the knee PN.

Therefore, according to the second embodiment, the following advantages are obtained in addition to the above-mentioned (2).

(5) An object to which the invention is applied is the vehicle seat S that is provided with the blower duct 19 including the outlet 22 provided below the seat cushion 17 and ejects air-conditioning air A flowing in the blower duct 19 upward from the outlet 22. Before the airbag 40 is inflated with the inflating gas G, the airbag 40 is disposed between the support section B and the seat cushion 17 while being in the non-inflation deployment state. In addition, the ventilation portion formed of the hole 76, which allows air-conditioning air A ejected from the outlet 22 to pass, is formed at the portion, which is positioned above the outlet 22, of the airbag 40 that is in the non-inflation deployment state (FIGS. 9A and 9B).

For this reason, not only before the airbag 40 is inflated but also when the airbag 40 is inflated, it is possible to prevent the outlet 22 of the blower duct 19 from being closed by the airbag 40. As a result, it is possible to suppress a phenomenon (submarine phenomenon) where the waist PP of the occupant P moves forward (slides forward) on the seat section 10, without inhibiting the ejection of the air-conditioning air A from the outlet 22.

(6) The substantially quadrangular ring-shaped partition wall portion 75 is formed at the portion, which is positioned above the outlet 22 of the blower duct 19, of the airbag 40 that is in the non-inflation deployment state. The hole 76 is formed in the non-inflation area 77 of the airbag 40 that is surrounded by the partition wall portion 75, is not supplied with the inflating gas G from the inflator 51, and is not inflated; and the ventilation portion is formed of the hole 76.

For this reason, it is possible to form the ventilation portion at the airbag 40 (inflation portion C) by only performing a simple work for forming the partition wall portion 75 and the hole 76 at the inflation portion C.

Third Embodiment

Figure 10:
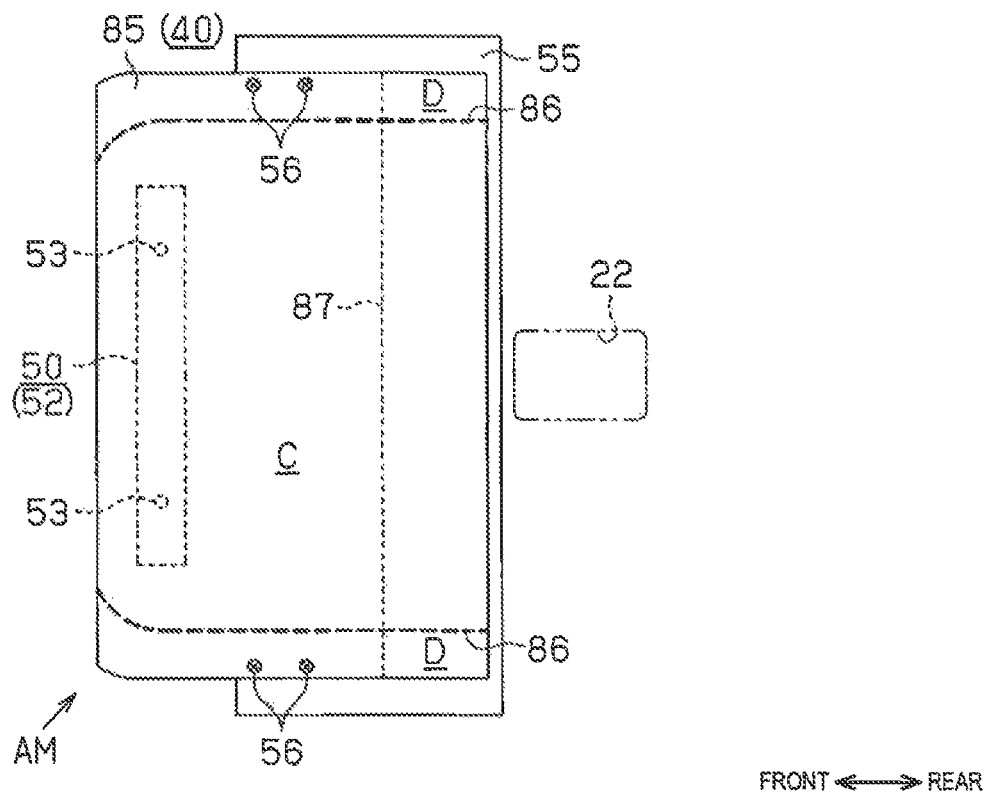
FIG. 10 is a plan view of a seat cushion airbag device according to a third embodiment of the invention.

Next, a third embodiment of the invention will be described with reference to FIGS. 10, 11A, and 11B.

The third embodiment is different from the first and second embodiments in terms of the following two points.

(I) Before an airbag 40 is inflated with an inflating gas G, the airbag 40 is disposed at a position, which is spaced apart from an outlet 22 toward an inflator 51 (front side), between a support section B and a seat cushion 17 while being deployed. Since this structure is employed, the airbag 40 is shorter than the airbags 40 of the first and second embodiments in the longitudinal direction. For this reason, the structure of the following (II) is employed to inflate the airbag 40 up to a higher position so that the volume of the airbag 40 is ensured.

(II) The airbag 40 is provided with upward inflation facilitating portions that facilitate the upward inflation of the airbag 40.

In more detail, the airbag 40 includes a pair of fabric portions 85 that vertically overlap each other. Both the fabric portions 85 are formed in a bag shape by being joined to each other at peripheral joints 86 that are formed at the peripheries of both the fabric portions 85. Joining using the peripheral joints 86 is performed while a part (rear portions) of both the fabric portions 85 are folded to the inside of the rest thereof (see FIG. 11A). Further, the upward inflation facilitating portions are formed of the portions of the fabric portions 85 that are folded inward (hereinafter, referred to as "folding portions 87").

Here, since the airbag 40 is inflated on the front side of the outlet 22, a contact suppressing sheet that is shorter than the contact suppressing sheets 55 of the first and second embodiments in the longitudinal direction (a contact suppressing sheet of which the rear end portion is positioned on the front side of the outlet 22) is used as a contact suppressing sheet 55.

Meanwhile, in the third embodiment, the same elements as the elements described in the above-mentioned first and second embodiments will be denoted by the same reference numerals and the repeated description thereof will be omitted.

The airbag device according to the third embodiment is formed as described above. Next, the operation of the airbag device will be described mainly in terms of the difference between the third embodiment and the first and second embodiments.

When an impact is not applied to a vehicle from the front by the front-end collision or the like and an inflating gas G is not supplied to the airbag 40 from the inflator 51, as shown in FIG. 11A, the airbag 40 is disposed at a position, which is spaced apart from the outlet 22 of the blower duct 19 toward the front side, between the support section B and the seat cushion 17 while being deployed. For this reason, the outlet 22 is not closed by both the airbag 40 and the contact suppressing sheet 55. The air-conditioning air A, which flows in the blower duct 19 and is ejected upward from the outlet 22, passes through the seat cushion 17 and reaches an occupant P. The occupant P comfortably feels cool or warm from the air-conditioning air A.

Further, at this time, a part (folding portions 87) of both the fabric portions 85 enter the inside of the rest thereof as the upward inflation facilitating portions while being folded to the inside of the rest thereof. For this reason, the airbag 40 is flat in the vertical direction.

Meanwhile, when a high-pressure inflating gas G is supplied to the airbag 40 from the inflator 51 in response to the impact applied to the vehicle, at least a part (inflation portion C) of the airbag 40 is inflated with the inflating gas G between the support section B and the seat cushion 17 as shown in FIG. 11B. At this time, the upward inflation facilitating portions (folding portions 87), which have been folded, are unfolded and extend in the shape of a substantially vertical surface, so that the upward inflation of the airbag 40 is facilitated. Due to the facilitation of the inflation, the airbag 40 is inflated up to a high position as compared to a case where the upward inflation facilitating portions (folding portions 87) are not formed. Meanwhile, FIG. 11B shows a state where the airbag 40 is inflated in the middle in the width direction of the seat section 10. The airbag is inflated so as to be highest at the middle portion thereof that is a portion most distant from both the peripheral joints 86 in the width direction of the seat section 10 and at the rear end portion thereof that is a portion where the upward inflation facilitating portions (folding portions 87) are most tense in the longitudinal direction. Further, the seat surface 10A of the seat section 10 is bulged out by the inflated airbag 40.

Accordingly, according to the third embodiment, the following advantages are obtained in addition to the above-mentioned (2).

Figure 11:
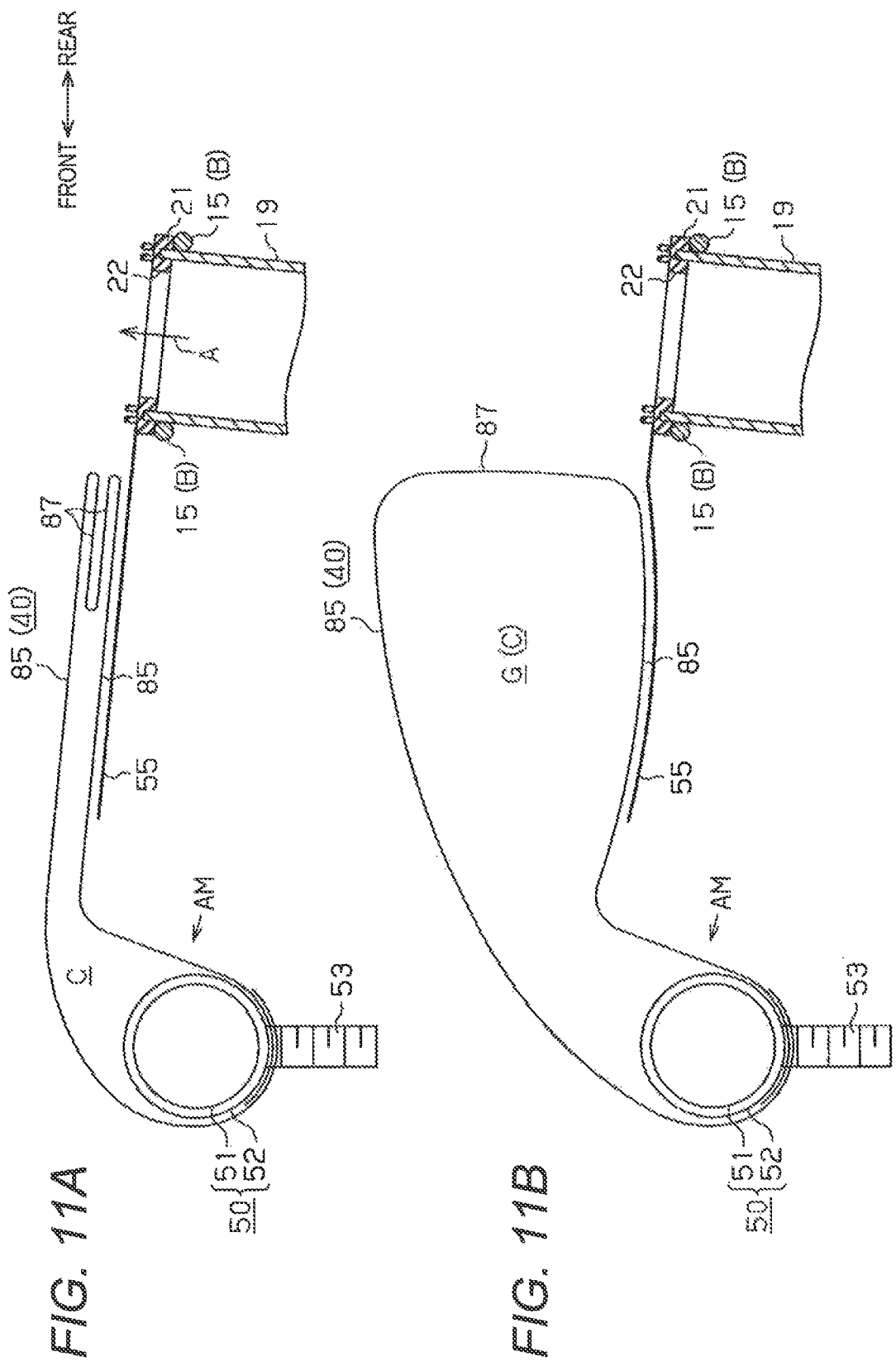

(7) An object to which the invention is applied is the vehicle seat S that is provided with the blower duct 19 including the outlet 22 provided below the seat cushion 17 and ejects air-conditioning air A flowing in the blower duct 19 upward from the outlet 22. Before the airbag 40 is inflated with the inflating gas 0, the airbag 40 is disposed at a position, which is spaced apart from the outlet 22 toward the front side, between the support section B and the seat cushion 17 while being deployed. In addition, the airbag 40 is provided with the upward inflation facilitating portions (folding portions 87) that facilitate the upward inflation of the airbag 40 (FIGS. 11 and 11B).

For this reason, not only before the airbag 40 is inflated but also when the airbag 40 is inflated, it is possible to prevent the outlet 22 of the blower duct 19 from being closed by the airbag 40. As a result, it is possible to suppress that the airbag 40 inhibits the ejection of the air-conditioning air A from the outlet 22.

Further, since it is possible to inflate the airbag 40 up to a higher position by the upward inflation facilitating portions (folding portions 87), it is possible to suppress a phenomenon (submarine phenomenon) where the waist PP of the occupant P moves forward on the seat section 10.

(8) The pair of fabric portions 85 vertically overlapping each other are joined to each other at the peripheral joints 86, so that the bag-shaped airbag 40 is formed. Joining using the peripheral joints 86 is performed while a part of both the fabric portions 85 are folded to the inside of the rest thereof. Further, the upward inflation facilitating portions are formed of the portions (folding portions 87) of the fabric portions 85 that are folded inward (FIG. 11A).

It is possible to form the upward inflation facilitating portions, which have a simple structure as described above and facilitate the upward inflation of the airbag 40, at the airbag 40.

Meanwhile, the invention may be embodied as the following additional embodiments.

For First Embodiment

Inward folding has been employed as the folding aspect of the folded portion 45 in the first embodiment, but the folded portion 45 may be folded by roll-folding or bellows-folding instead of the inward folding.

Figure 12:
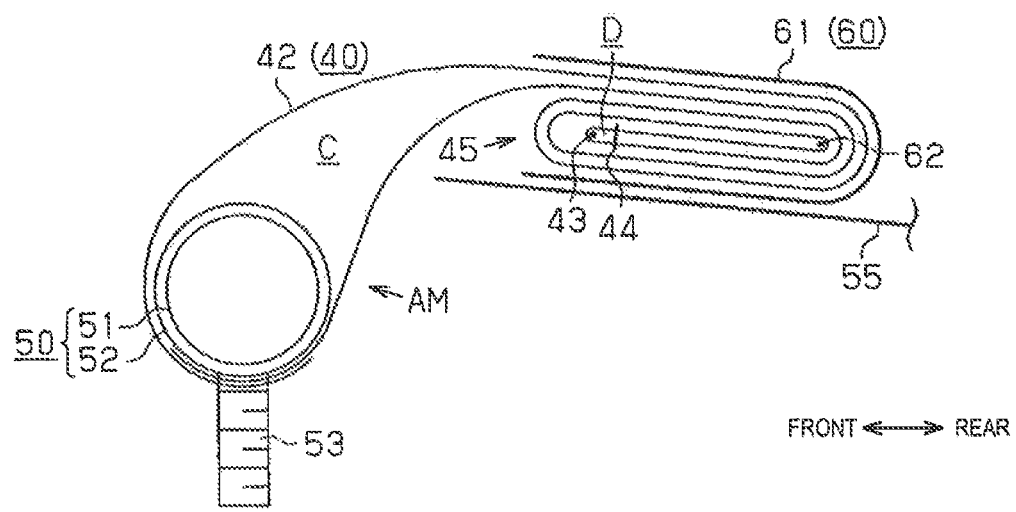
FIG. 12 is a view showing a modification of the first embodiment and is a partial side cross-sectional view of a seat cushion airbag device.

The roll-folding is a folding aspect where the other portion of the airbag is wound so as to spiral around the end portion of the folded portion 45 of the airbag 40 as a center as shown in FIG. 12.

As the aspects of the roll-folding, there may be an aspect where the center of the roll-folding portion is positioned below a boundary portion between the folded portion 45 and the rest (front portion) of the airbag 40 as shown in FIG. 12 and an aspect (not shown) where the center of the roll-folding portion is positioned above a boundary portion between the folded portion 45 and the rest (front portion) of the airbag 40.

Any of the aspects may be employed, but it is thought that a load applied to the folded portion 45 at the time of the deployment of the airbag is more reduced in the former case. When the folded portion 45 is deployed, the seat cushion 17 is positioned on the folded portion 45 and the wire frame parts 15 are positioned below the wire frame parts 15. The folded portion 45 is deployed rearward while widening the spaces between the seat cushion 17 and the wire frame parts 15. At this time, a load generated by the occupant P is applied to the seat cushion 17. Meanwhile, the wire frame parts 15 have spring elasticity. For this reason, the load applied to the folded portion 45 at the time of the deployment of the airbag may be small when the wire frame parts 15 are bent downward so that the spaces are widened rather than when the seat cushion 17 is pushed up so that the spaces are widened.

Meanwhile, when the center of the roll-folding portion is positioned below the boundary portion between the folded portion 45 and the rest (front portion) of the airbag 40, the roll-folding portion is deployed while being unfolded downward. For this reason, the load applied to the folded portion 45 at the time of the deployment of the airbag may be small.

Figure 13:
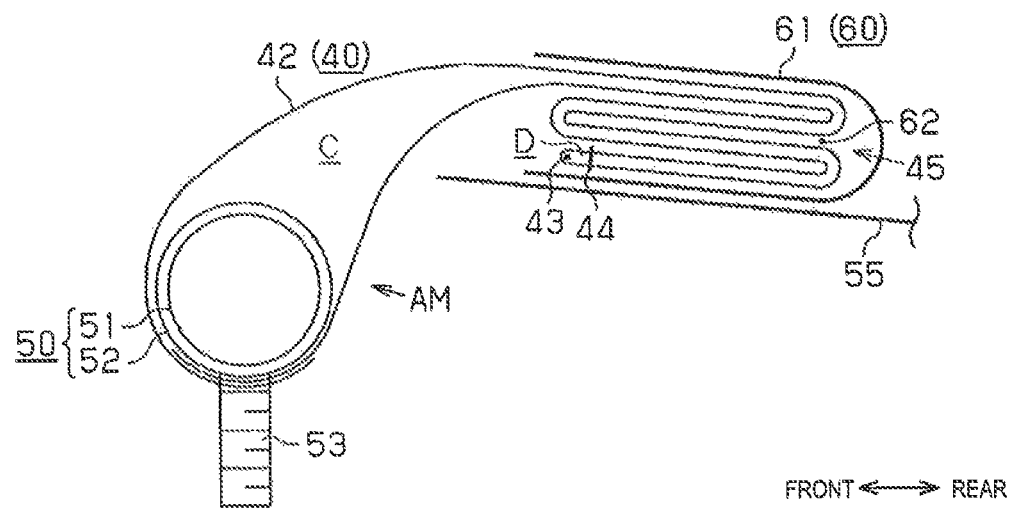
FIG. 13 is likewise a view showing the modification of the first embodiment and is a partial side cross-sectional view of the seat cushion airbag device.

The bellows-folding is a folding aspect where the folded portion 45 of the airbag 40 is folded back while the folding direction of the folded portion 45 is alternately changed at a constant width as shown in FIG. 13.

The size, shape, and the like of the wrapping sheet 60 may be changed into the size, shape, and the like different from those of the first embodiment under the condition that at least the folded portion 45, which is folded, as an object to be wrapped is wrapped with the wrapping sheet 60 before the inflation of the airbag 40.

The wrapping sheet 60 may be fixed to the inflator 51 instead of the contact suppressing sheet 55. For example, at least one of the upper and lower portions of the wrapping sheet 60, which is folded in half, further extends forward as compared to the first embodiment and may be locked to the bolts 53 of the retainer 52.

The rear end portion of the folded portion 45 may be positioned above the outlet 22 when the folded portion 45 is deployed.

For Second Embodiment

In an airbag 40 divided into an inflation portion C that is supplied with an inflating gas G from an inflator 51 and is inflated and a non-inflation portion D that is not supplied with the inflating gas G and is not inflated, the inflation portion C may be formed at a portion avoiding an outlet 22 and a ventilation portion may be formed at a portion of the non-inflation portion D positioned above the outlet 22.

Figure 14A:
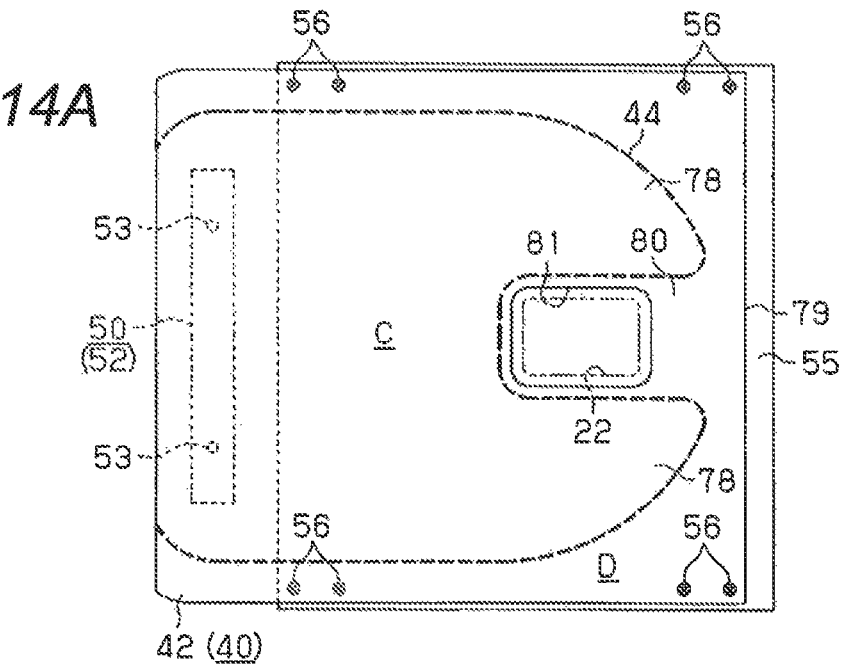
FIGS. 14A and 14B are plan views of a seat cushion airbag device.

An example thereof is shown in FIG. 14A. The inflation portion C includes a pair of inflation pieces 78 that are positioned on both sides of the outlet 22 in the width direction of a seat section 10 (vertical direction in FIG. 14A). The non-inflation portion D includes a non-inflation piece 80 that extends from an outer edge portion (rear edge portion) 79 of the airbag 40 toward the outlet 22 and is interposed between both the inflation pieces 78. A substantially quadrangular hole 81, which is slightly larger than the outlet 22, is formed at a portion of the non-inflation piece 80 that is positioned above the outlet 22, and the ventilation portion is formed of the hole 81.

According to this structure, when the airbag 40 is deployed and disposed between the support section B and the seat cushion 17 before being inflated with the inflating gas G, the inflation portion C is positioned at the portion avoiding the outlet 22. That is, the pair of inflation pieces 78 of the inflation portion C are positioned on both sides of the outlet 22 in the width direction of the seat section 10. Further, the ventilation portion formed at the non-inflation portion D is positioned above the outlet 22. That is, the non-inflation piece 80 of the non-inflation portion D, which extends from the outer edge portion 79 of the airbag 40 toward the outlet 22 and is interposed between both the inflation pieces 78, is positioned above the outlet 22 at a portion that is spaced apart from the outer edge portion (rear edge portion) 79 of the airbag 40 toward the front side. Accordingly, the ventilation portion (hole 81), which is formed at the portion of the non-inflation piece 80 spaced apart from the outer edge portion 79 of the airbag 40, is also positioned above the outlet 22. For this reason, the air-conditioning air A, which flows in the blower duct 19 and is ejected upward from the outlet 22, passes through the ventilation portion (hole 81) of the non-inflation portion D and the seat cushion 17 in this order and reaches an occupant P.

Meanwhile, the non-inflation piece 80 of the non-inflation portion D is positioned between the ventilation portion (hole 81) and the outer edge portion 79 of the airbag 40. The rear portions of the pair of inflation pieces 78, which are positioned on both sides of the outlet 22 in the width direction of the seat section 10, are connected to each other by the non-inflation piece 80. For this reason, the movement of both the inflation pieces 78 in the direction where the space between the inflation pieces 78 is widened is restricted by the non-inflation piece 80.

Meanwhile, when a high-pressure inflating gas C is supplied to the airbag 40 from the inflator 51, the pair of inflation pieces 78 of the inflation portion C of the airbag are inflated with the inflating gas G between the support section B and the seat cushion 17 at the portions that are positioned on both sides of the outlet 22 in the width direction of the seat section 10 (at the portions avoiding the outlet 22). The rest of the inflation portion C is also inflated between the support section B and the seat cushion 17. The non-inflation portion D of the airbag 40 including the non-inflation piece 80 is not inflated. Further, the seat surface 10A of the seat section 10 is bulged out by the inflation portion C that is inflated as described above.

As a result, even when change is applied as described above, the same advantages as the above-mentioned second embodiment are obtained and it is possible to suppress the movement of both the inflation pieces 78 in the direction where the space between the inflation pieces 78 is widened.

In an airbag 40 divided into an inflation portion C that is supplied with an inflating gas G from an inflator 51 and is inflated and a non-inflation portion D that is not supplied with the inflating gas G and is not inflated, a cutout portion 82, which extends from an outer edge portion (rear edge portion) 79 of the non-inflation portion D to a portion positioned above at least an outlet 22, is formed at the non-inflation portion D. The ventilation portion may be formed of a part of the cutout portion 82.

Figure 14B:
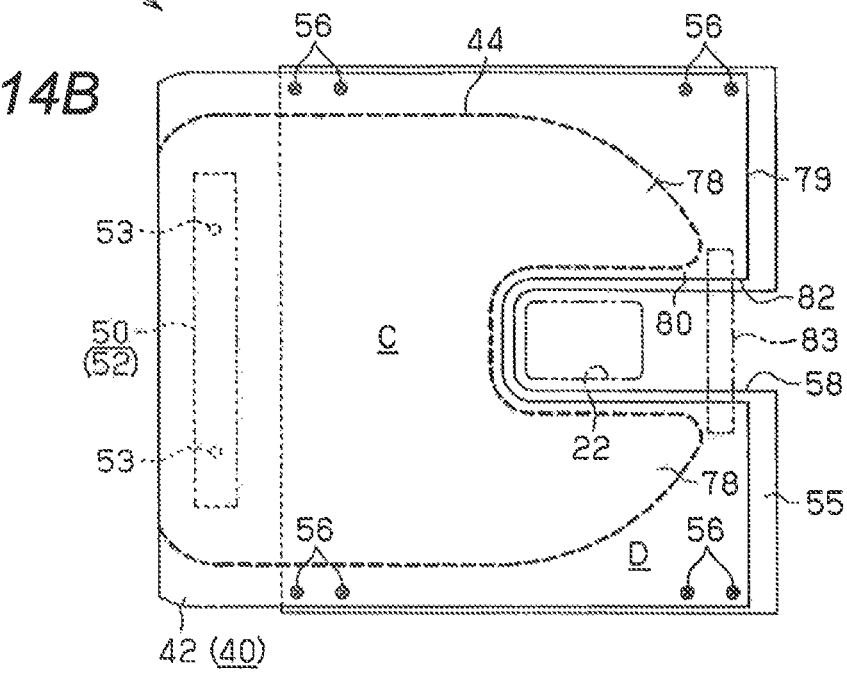

An example thereof is shown in FIG. 14B. The inflation portion C includes a pair of inflation pieces 78 that are positioned on both sides of the outlet 22 in the width direction of a seat section 10 (vertical direction in FIG. 14B). The non-inflation portion D includes a non-inflation piece 80 that extends from the outer edge portion (rear edge portion) 79 of the airbag 40 to the portion positioned above the outlet 22 and is interposed between both the inflation pieces 78. The cutout portion 82 is formed over substantially the entire area of the non-inflation piece 80.

Meanwhile, the non-inflation portion D and the cutout portion 82 may extend to a portion positioned on the front side of the outlet 22.

According to this structure, when the airbag 40 is deployed and disposed between the support section B and the seat cushion 17 before being inflated with the inflating gas G, the inflation portion C is positioned at the portion avoiding the outlet 22. Further, a part of the cutout portion 82 formed at the non-inflation portion D is positioned above the outlet 22. Accordingly, a ventilation portion formed of a part of the cutout portion 82 is positioned above the outlet 22. For this reason, the air-conditioning air A, which flows in the blower duct 19 and is ejected upward from the outlet 22, passes through the ventilation portion (cutout portion 82) of the non-inflation portion D and the seat cushion 17 in this order and reaches an occupant P.

Meanwhile, when a high-pressure inflating gas G is supplied to the airbag 40 from the inflator 51 in response to the impact applied to the vehicle, the inflation portion C of the airbag 40 is inflated with the inflating gas G at the portion avoiding the outlet 22 between the support section B and the seat cushion 17. The rest of the inflation portion C is also inflated between the support section B and the seat cushion 17. The non-inflation portion D of the airbag 40 is not inflated. Further, the seat surface 10A of the seat section is bulged out by the inflation portion C that is inflated as described above.

As a result, even when change is applied as described above, the same advantages as the above-mentioned second embodiment are obtained.

Meanwhile, in the above-mentioned case, a cutout portion 58, which extends from an outer edge portion of the contact suppressing sheet 55 to a portion positioned above at least the outlet 22, may also be formed at the contact suppressing sheet 55. Further, although not shown, instead of the cutout portion 58 of the contact suppressing sheet 55, a vent 57 may be formed at a portion of the contact suppressing sheet 55, which is positioned above the outlet 22 as in the first embodiment.

Furthermore, as shown by a two-dot chain line of FIG. 14B, portions of the non-inflation portion D, which are positioned on both sides of the cutout portion 82 in the width direction of the seat section 10, may be connected to each other by a connecting member 83 on the rear side of the outlet 22. For example, a belt-like fabric piece may be used as the connecting member 83. Moreover, both end portions of the connecting member 83 may be fixed to the non-inflation portion D by means, such as seaming, adhesion, or welding. According to this, the movement of outer portions of the non-inflation portion D that are positioned on both sides of the cutout portion 82, or both the inflation pieces 78, which are positioned on both sides of the cutout portion 82, in the direction where the space between the outer portions of the non-inflation portion D or the inflation pieces 78 is widened can be restricted by the connecting member 83. Moreover, since the connecting member 83 is disposed on the rear side of the outlet 22, the connecting member 83 does not close the outlet 22.

> The ventilation portion only has to allow the air-conditioning air A, which is ejected from the outlet 22, to pass. Accordingly, a poromeric sheet (not shown) is stretched on the hole 76 that is formed in the non-inflation area 77 of the airbag 40, and the ventilation portion may be formed of the sheet.

For Third Embodiment

Figure 15:
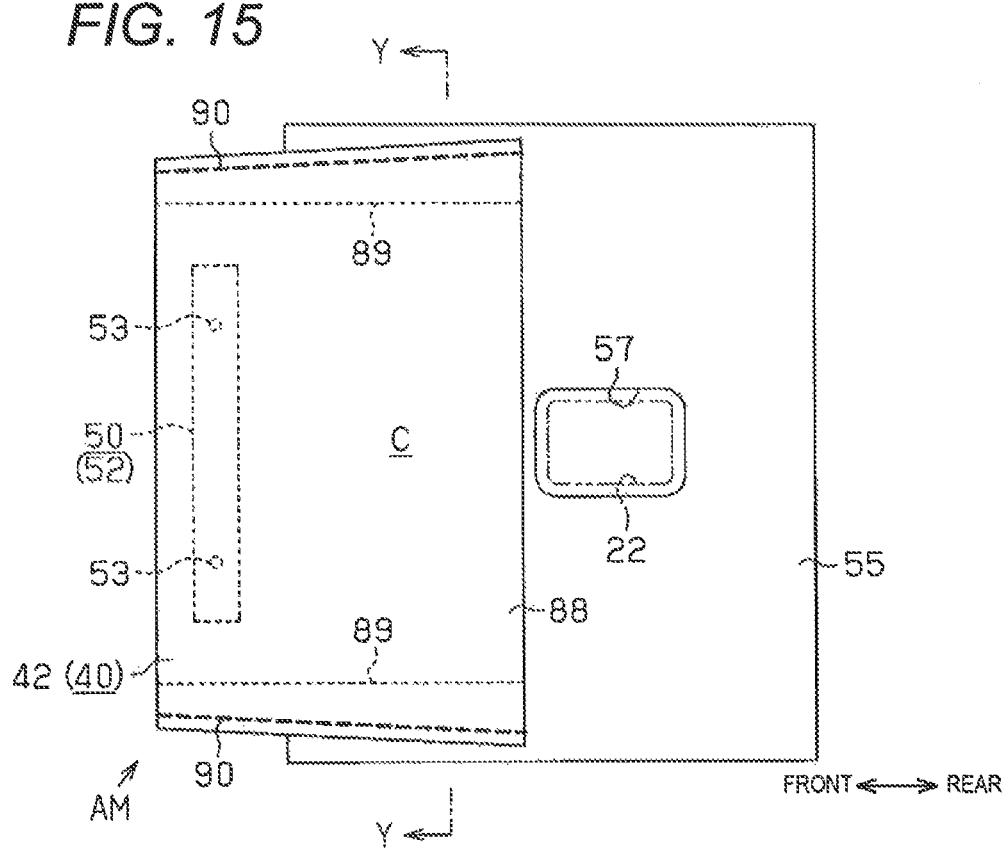
FIG. 15 is a view showing a modification of the third embodiment and is a plan view of a seat cushion airbag device of which an airbag is not yet inflated.
Figure 16A:
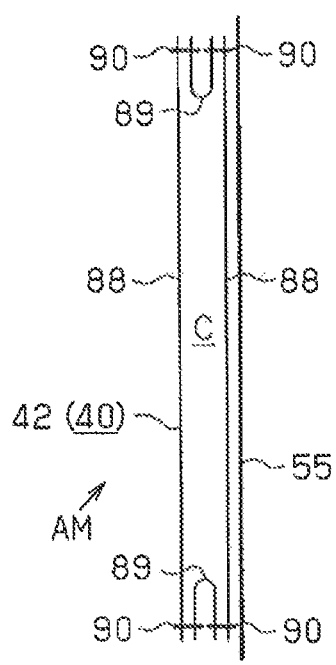
Figure 16B:
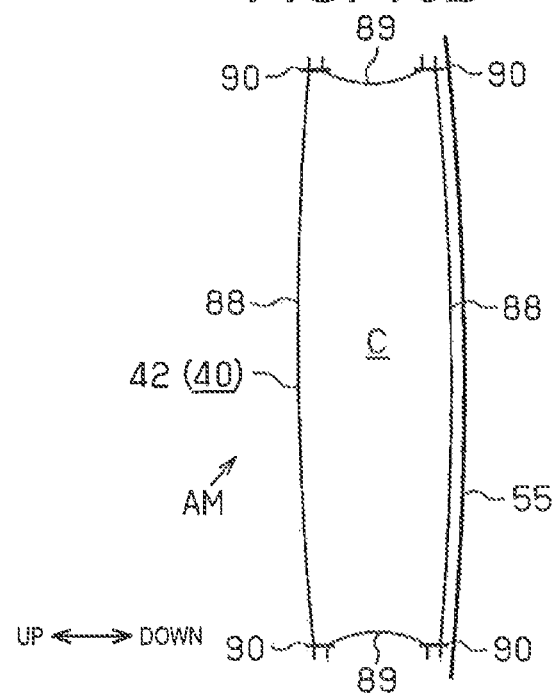

> The upward inflation facilitating portion may be changed as shown in FIGS. 15, 16A, and 16B. In this case, an airbag 40 includes a pair of main body fabric portions 88 and a pair of intermediate fabric portions 89 as the upward inflation facilitating portions. Both the main body fabric portions 88 vertically overlap each other. Both the intermediate fabric portions 89 are disposed at two outer edge portions, which face each other in the width direction of the seat section 10, between outer edge portions, which face each other, of both the main body fabric portions 88, respectively; and are joined to the outer edge portions of both the main body fabric portions 88 by the side edge joints 90.

Further, since the respective intermediate fabric portions 89 are folded before the airbag 40 is inflated with the inflating gas d, both the main body fabric portions 88 are disposed on the support section B while being close to each other. In this case, the respective intermediate fabric portions 89 may be folded so as to be interposed between both the main body fabric portions 88, and may be folded so as to protrude outward from the space between both the main body fabric portions 88.

According to the airbag device that is formed in this way, before the airbag 40 is inflated with the inflating gas G, the respective intermediate fabric portions 89 are folded as the upward inflation facilitating portions. Accordingly, both the main body fabric portions 88 are close to each other.

Meanwhile, when a high-pressure inflating gas G is supplied to the airbag 40 from the inflator 51 in response to the impact applied to the vehicle, the airbag 40 is inflated between the support section B and the seat cushion 17. At this time, the respective intermediate fabric portions 89 (upward inflation facilitating portions), which have been folded as described above, are unfolded and extend in the shape of a vertical surface, so that the upward inflation of the airbag 40 (the inflation of the airbag in the direction where both the main body fabric portions 88 are separated from each other in the vertical direction) is facilitated.

Accordingly, even when the upward inflation facilitating portions are changed as described above, the same advantages as the third embodiment are obtained.

> In the above-mentioned case, the intermediate fabric portions 89 may be disposed at one or three or more positions between the outer edge portions, which face each other, of both the main body fabric portions 88.

For Items Common to First to Third Embodiments and Modifications Thereof

<<For Joints>>
> Various joints (the peripheral joints 44 and 86 and the side edge joints 90) may be formed in aspects that are different from seaming using sewing threads, for example, adhesion using an adhesive, welding, and the like.

<<For Airbag 40>>
> The airbag 40 may be formed by folding back a plurality of fabrics, which vertically overlap each other, along a common folding line, which is set in the middle of the fabrics in common, so as to vertically laminate the fabrics and joining the fabrics at peripheral joints. The strength of the airbag 40 is increased with an increase in the number of fabrics to be used.

> The airbag 40 may be formed by joining a plurality of fabrics, which vertically overlap each other, at peripheral joint without folding back the fabrics.

> Substantially the entire airbag 40 may be formed of the inflation portion C.

<<For Contact Suppressing Sheet 55>>
> In each of the embodiments, a sheet of which only the side facing the airbag 40 is formed of a felt has been used as the contact suppressing sheet 55. However, a sheet of which the entire portion is formed of a felt may be used as contact suppressing sheet 55.

> In each of the embodiments, a sheet of which only the side facing the support section B is formed of a soft resin sheet has been used as the contact suppressing sheet 55. However, a sheet of which the entire portion is formed of a soft resin sheet may be used as contact suppressing sheet 55.

> The contact suppressing sheet 55 may be made of materials that are different from the above-mentioned felt and soft resin sheet, for example, fabrics, paper, cushion materials, and the like.

> The contact suppressing sheet 55 may be fixed to the inflation portion C of the airbag 40 and may be fixed to both the inflation portion C and the non-inflation portion D.

> The contact suppressing sheet 55 may be formed of a plurality of sheets. In this case, the contact suppressing sheet 55 may be provided only on a portion of the airbag that is particularly apt to be damaged by the contact with the support section B.

> The contact suppressing sheet 55 may be fixed to the airbag 40 by fixing means other than thermal welding.

> The contact suppressing sheet 55 may be locked to the support section B in addition to or instead of the airbag 40.

<<Others>>

The invention may also be applied to a seat cushion airbag device that uses an airbag having a structure different from the structure of each of the embodiments as the airbag 40.

The invention may be widely applied to a seat cushion airbag device where at least a part of the airbag 40 is formed of the inflation portion C and the inflation portion C is inflated between the support section B and the seat cushion 17.

In the invention, an object other than an occupant P, for example, baggage or the like may be an object to be restrained. Even when the baggage or the like is placed on the seat section 10 as an object to be restrained, the same advantages as each of the embodiments are obtained.

The seat cushion airbag device according to the embodiment of the invention may also be applied to a vehicle where vehicle seats S are disposed in a direction that is different from the longitudinal direction of the vehicle, for example, a direction orthogonal to the longitudinal direction (the width direction of the vehicle) when an occupant P is seated.

The seat cushion airbag device according to the embodiment of the invention may be applied to any one of a plurality of vehicle seats that are arranged in the cabin in the longitudinal direction.

An inflator having a structure different from the structure of the inflator 51 may be used as the inflating fluid generation source. Further, a fluid other than the inflating gas G may be used as the inflating fluid.

The invention may also be applied to a vehicle seat S where the seat cushion 17 is supported by a seat pan, which is a plate-like member, instead of the wire frame parts 15.

What is claimed is:

1. A seat cushion airbag device mountable to a vehicle seat, the vehicle seat comprising: a seat section comprising a seat cushion supported from below by a support section of a seat frame; and a blower duct having an outlet provided below the seat cushion, the vehicle seat being configured to eject air-conditioning air upward from the blower duct through the outlet,
   said seat cushion airbag device comprising an airbag,
   wherein at least a part of the airbag between the support section and the seat cushion is inflated with an inflating fluid generated from an inflating fluid generation source such that a seat surface of the seat section is bulged out, thereby suppressing a forward movement of an object to be restrained on the seat section,
   wherein the airbag comprises a folded portion,
   wherein before the airbag is inflated with the inflating fluid, the airbag is disposed at a position on a front side of the outlet while the folded portion is folded, such that the outlet is exposed from the airbag, and
   wherein when the airbag is inflated, the folded portion is deployed so as to extend to a position on a rear side of the outlet.

2. The seat cushion airbag device according to claim 1, further comprising:
   a contact suppressing sheet which suppresses contact between the support section and the airbag when the folded portion is folded and which suppresses contact between the support section and the airbag when the folded portion is deployed.

3. The seat cushion airbag device according to claim 1, further comprising:
   a wrapping sheet which wraps an object which is at least a part of the air bag in a state prior to inflation of the airbag, wherein the object comprises at least the folded portion in a folded state.

4. The seat cushion airbag device according to claim 1, wherein the folded portion is folded in any one form of inward folding, roll-folding, and bellows-folding.

5. A seat cushion airbag device mountable to a vehicle seat, the vehicle seat comprising: a seat section comprising a seat cushion supported from below by a support section of a seat frame; and a blower duct having an outlet provided below the seat cushion, the vehicle seat being configured to eject air-conditioning air upward from the blower duct through the outlet,
   said seat cushion airbag device comprising an airbag,
   wherein at least a part of the airbag between the support section and the seat cushion is inflated with an inflating fluid generated from an inflating fluid generation source such that a seat surface of the seat section is bulged out, thereby suppressing a forward movement of an object to be restrained on the seat section,
   wherein before the airbag is inflated with the inflating fluid, the airbag is deployed and is disposed between the support section and the seat cushion, and
   wherein the airbag comprises a ventilation portion which allows the air-conditioning air ejected from the outlet to pass therethrough and which is formed at a portion to be positioned above the outlet.

6. The seat cushion airbag device according to claim 5,
   wherein the airbag comprises an annular partition wall portion formed at a part of the airbag,
   wherein an area surrounded by the partition wall portion forms a non-inflation area which is not supplied with the inflating fluid from the inflating fluid generation source and which is not inflated, and
   wherein the ventilation portion is formed in the non-inflation area.

7. The seat cushion airbag device according to claim 5,
   wherein the airbag comprises:
   an inflation portion which is supplied with the inflating fluid from the inflating fluid generation source and is inflated; and
   a non-inflation portion which is not supplied with the inflating fluid and is not inflated,
   wherein the inflation portion is formed at a portion except the outlet, and wherein the ventilation portion is formed at a portion of the non-inflation portion positioned above the outlet.

8. The seat cushion airbag device according to claim 7,
   wherein the inflation portion comprises a pair of inflation pieces positioned on both sides of the outlet in a width direction of the seat section, respectively;
   wherein the non-inflation portion comprises a non-inflation piece which extends from an outer edge portion of the airbag toward the outlet and which is interposed between both the inflation pieces, and
   wherein the ventilation portion is formed at a portion of the non-inflation piece spaced apart from the outer edge portion of the airbag.

9. The seat cushion airbag device according to claim 5,
   wherein the airbag comprises:
   an inflation portion which is supplied with the inflating fluid from the inflating fluid generation source and is inflated; and a non-inflation portion which is not supplied with the inflating fluid and is not inflated, wherein a cutout portion extending from an outer edge portion of the non-inflation portion to a portion positioned above at least the outlet is formed at the non-inflation portion, and wherein the ventilation portion is formed of a part of the cutout portion.

* * * * *